(12) United States Patent
Rich et al.

(10) Patent No.: US 8,779,925 B2
(45) Date of Patent: Jul. 15, 2014

(54) CUSTOM-SHAPE WIRELESS DOG FENCE SYSTEM AND METHOD

(75) Inventors: Christopher T Rich, Leola, PA (US); Christopher Kamery, Buffalo, NY (US); Marko Lubic, Shillington, PA (US); Wade Patterson, Huntsville, AL (US); Steve Conrad, Huntsville, AL (US); Jason S. Gurley, Madison, AL (US); Terry G. Phillips, Meridianville, AL (US); John J. White, Jr., Huntsville, AL (US)

(73) Assignee: Woodstream Corporation, Lititz, PA (US)

( * ) Notice: Subject to any disclaimer, the term of this patent is extended or adjusted under 35 U.S.C. 154(b) by 543 days.

(21) Appl. No.: 13/067,248

(22) Filed: May 18, 2011

(65) Prior Publication Data

US 2011/0298615 A1 Dec. 8, 2011

Related U.S. Application Data

(60) Provisional application No. 61/344,074, filed on May 18, 2010, provisional application No. 61/457,075, filed on Dec. 21, 2010.

(51) Int. Cl.
*G08B 23/00* (2006.01)
*A01K 15/02* (2006.01)

(52) U.S. Cl.
CPC .................................. *A01K 15/023* (2013.01)
USPC ..................... 340/573.3; 340/564; 340/573.4; 340/572.1; 340/572.4; 340/686.1; 119/712; 119/719

(58) Field of Classification Search
CPC ...... G01C 21/00; G01C 21/36; G01S 5/0036; G01S 5/0294; A61B 5/1122; G06K 2107/0045; G08B 13/1427; G08B 21/0202; G08B 21/0227; G08B 21/088

USPC ............ 340/10.1, 572.1–572.4, 573.3–573.4, 340/564, 686.1; 119/712, 719
See application file for complete search history.

(56) References Cited

U.S. PATENT DOCUMENTS

| | | | |
|---|---|---|---|
| 5,933,079 A | 8/1999 | Frink | |
| 5,949,350 A * | 9/1999 | Girard et al. | 340/8.1 |

(Continued)

FOREIGN PATENT DOCUMENTS

WO WO 2008/085812 7/2008

*Primary Examiner* — Daniel Wu
*Assistant Examiner* — Son M Tang
(74) *Attorney, Agent, or Firm* — Jacobson Holman, PLLC

(57) ABSTRACT

A custom-shaped wireless fence system is provided that contains one or more dogs in a user-defined containment area without the need for a physical fence or underground wire. The system, which is easy to set up and use, includes at least three base units and at least one collar and, preferably, a remote controller. A virtual fence is defined around the containment area, as well as around optional exclusion zones within the containment area, during system set up through communication between the base units and a trackable device as the user walks around the desired border. Visualization software enables the user to verify that the location of the fence is as desired and that the system is operating properly using a computing device having a display screen. In use, the system employs improved filtering of consecutive distance measurement values taken between the base units and the collar to discount errant measurement values in terms of their contribution to the current calculation of the dog's location. These filtering techniques, in combination with improved signal strength and antenna diversity in the communication between the base units and the collar, improve the accuracy and consistency with which the dog's location within a containment area is tracked so that unwanted corrections are not administered to the dog.

43 Claims, 22 Drawing Sheets

(56) References Cited

U.S. PATENT DOCUMENTS

| | | | |
|---|---|---|---|
| 5,982,291 A * | 11/1999 | Williams et al. | 340/635 |
| 6,230,661 B1 * | 5/2001 | Yarnall et al. | 119/721 |
| 6,404,338 B1 | 6/2002 | Koslar | |
| 6,700,492 B2 * | 3/2004 | Touchton et al. | 340/573.1 |
| 6,747,555 B2 * | 6/2004 | Fellenstein et al. | 340/524 |
| 7,164,354 B1 * | 1/2007 | Panzer | 340/539.15 |
| 7,173,535 B2 * | 2/2007 | Bach et al. | 340/573.3 |
| 7,259,718 B2 * | 8/2007 | Patterson et al. | 342/463 |
| 7,319,397 B2 * | 1/2008 | Chung et al. | 340/572.4 |
| 7,477,155 B2 * | 1/2009 | Bach et al. | 340/573.3 |
| 7,538,679 B2 * | 5/2009 | Shanks | 340/572.1 |
| 7,830,257 B2 * | 11/2010 | Hassell | 340/572.1 |
| 8,274,396 B2 * | 9/2012 | Gurley et al. | 340/686.1 |
| 8,297,233 B2 * | 10/2012 | Rich et al. | 119/721 |
| 2006/0027185 A1 | 2/2006 | Troxler | |
| 2006/0112901 A1 | 6/2006 | Gomez | |
| 2008/0055154 A1 | 3/2008 | Martucci et al. | |
| 2008/0156277 A1 | 7/2008 | Mainini et al. | |
| 2008/0186197 A1 | 8/2008 | Rochelle et al. | |
| 2009/0002188 A1 * | 1/2009 | Greenberg | 340/686.1 |
| 2010/0033339 A1 | 2/2010 | Gurley et al. | |

* cited by examiner

FIG. 4

Topology Algorithm —118

The Base and 3 Anchors perform Ranging Events to yield 40 Distance Values (DV) for each pair (six pairs total A to B, A to C, A to D, B to C, B to D, & C to D). Each set of 40 is filtered and averaged to a single Distance Value. —120

A reference grid is established to provide a spatial relationship for the hardware, boundaries and tracked elements (collar and RC) —122

Position of Base A is defined as (0, 0) —124

Position of Anchor B is defined as (Bx, 0) where Bx is the DV returned between A and B —126

The DV for Base A and Anchor C is compared to the DV for Anchor B and Anchor D. The shorter of the two is used to locate the associated Anchor's position. Assuming B to D is shorter, then Anchor D is defined first with Anchor C's calculated location being dependent on it. —128

Position of Anchor D is defined as (Dx,Dy)
* the distance between (0,0) and (Dx,Dy) = the DV found between Base A and Anchor D
* the distance between (Cx,Cy) and (Dx,Dy) = the DV found between Anchor C and Anchor D
* the distance between (Bx,0) and (Dx,Dy) = the DV found between Anchor B and Anchor D
—130

Position of Anchor C is defined as (Cx,Cy)
* the distance between (0,By) and (Cx,Cy) = the DV found between Anchor B and Anchor C
* the distance between (Dx,Dy) and (Cx,Cy) = the DV found between Anchor D and Anchor C
—132

FIG. 5A

Fence Setting Mode

140 — The consumer places training flags at 6 foot intervals along the desired boundary line 142 — Set a fence with the RC by pressing start and walking the flagged boundary line. The RC is tracked by the System and its Fence Location Values are recorded.

144 — Two consecutive Fence Location Values can be joined by a straight line segment. The Fence is actually a series of connected line segments that are mathematically defined and stored into memory.

146 — A pause and resume feature is provided to accommodate any interruptions (physical or temporal) during the fence recording.

148 — Pressing the complete button closes the Fence (the System connects the first and last points Fence Location Values.

150 — Every third Fence Location Value is used as an endpoint to the joined line segments. This was done to ration allocated memory space. Since the Fence Location Values are coming at a pace of about every second, there is no appreciable degradation to the smoothness of the Fence when a slow to normal walking pace is employed.

FENCE SHOWN WITH BASE LOCATIONS TOO. SMALL DOTS ARE THE ACTUAL TRACKING LOCATION VALUES OF THE REMOTE. WE CHOSE TO SET A FLAG POINT AT EVERY THIRD VALUE TO ENABLE LARGE FENCES AND HELP SMOOTH OUT BOUNDARY ZIG ZAG.

SCREEN SHOT SHOWING HISTORY OF COLLAR TRACKING LOCATION VALUES (SMALL DOTS). DOTS OUTSIDE OF THE FENCE WOULD HAVE RESULTED IN A BREACH CONDITION.

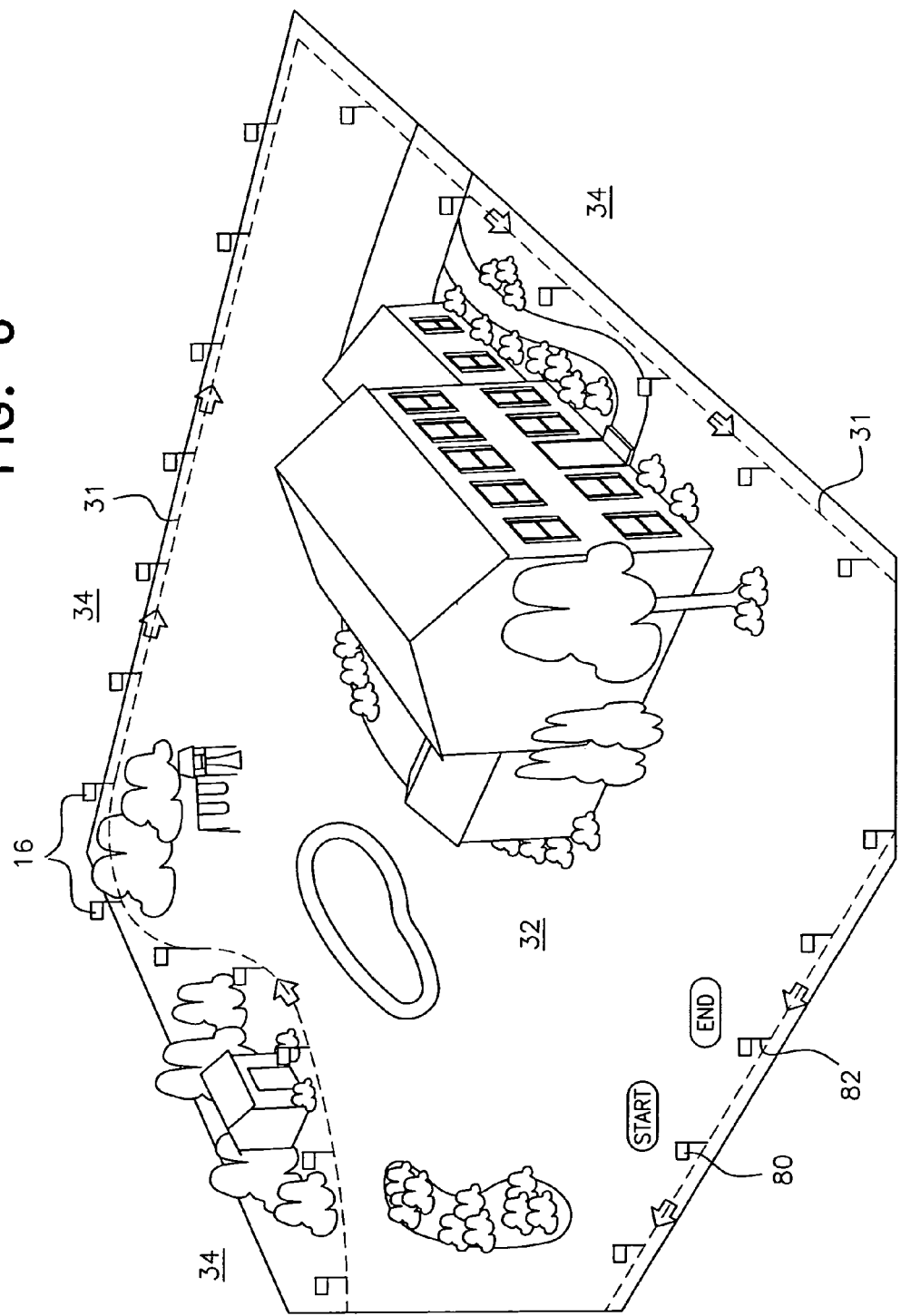

FIG. 7

Exclusion Zone Mode

160 — The consumer places training flags at 6 foot intervals along the desired boundary line 162 — Set an Exclusion Zone boundary with the RC by pressing start and walking the flagged boundary line. The RC is tracked by the System and its Fence Location Values are recorded.

164 — Two consecutive Fence Location Values can be joined by a straight line segment. The Exclusion Zone Boundary is actually a series of connected line segments that are mathematically defined and stored into memory.

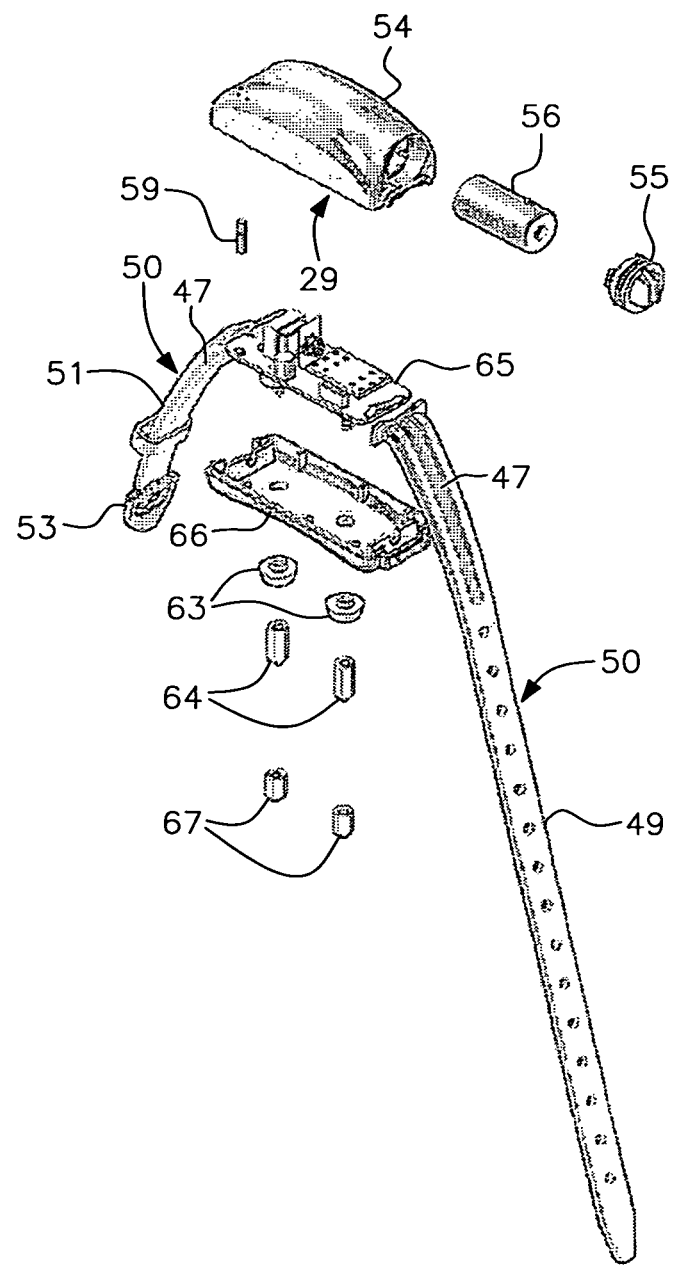

FIG. 10

Collar Setting Mode

170 — The consumer uses the RC to Add, Name, Delete or Change Settings for a Collar 172 — Adding a Collar is achieved with a button press on the RC which engages Base A in a seek mode. The Collar is programmed to transmit/seek an enabled device when powered On. Base A identifies the unique MAC address associated with the collar and stores its identity. The System can handle multiple collars.

174 — Collars can be named (Lucky) for future reference with the RC.

176 — Collar correction levels and ON/OFF status are changed with the RC.

178 — Collars are deleted from the System with the RC.

FIG. 14

System Monitoring Mode

230
The RC displays the following System parameters
* Battery Charge Status of the RC
* Collar Battery Charge Status for each collar
* Fence Status (On/Off)
* Breach Alert 232
Breach Detection is achieved using a modified point-in-polygon methodology. The TLV or CLV is tested for boundary status by:

* Using the TLV/CLV as a starting location and mathematically generating a vector from that point to infinity.
* The number of Fence or Exclusion Zone line segments that are intersected by the resulting vector is calculated.
* If that number is odd, then the TLV/CLV is in an allowed area.
* If that number is even or zero, then the TLV/CLV is either in an exclusion zone or outside of the Fence Boundary.

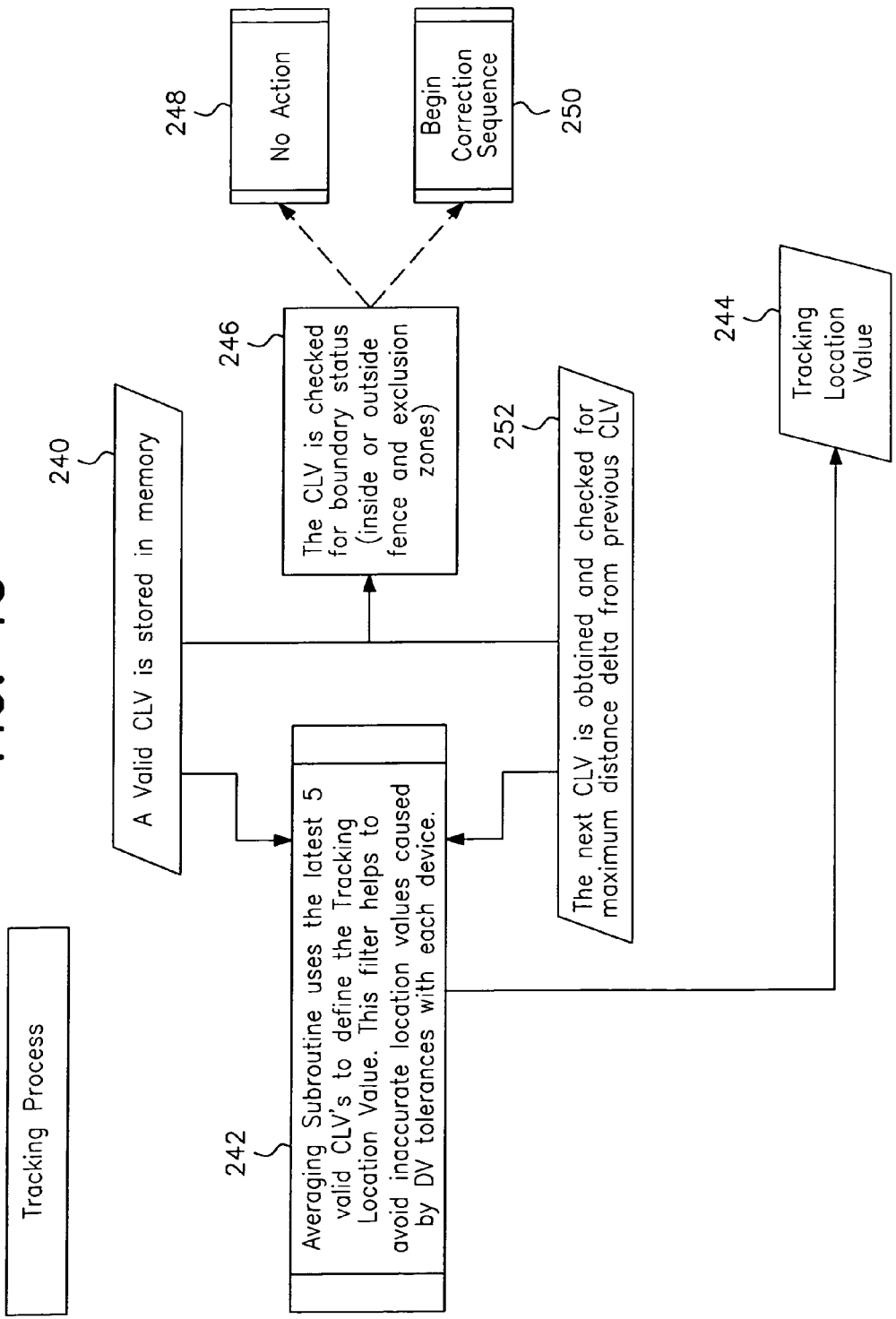

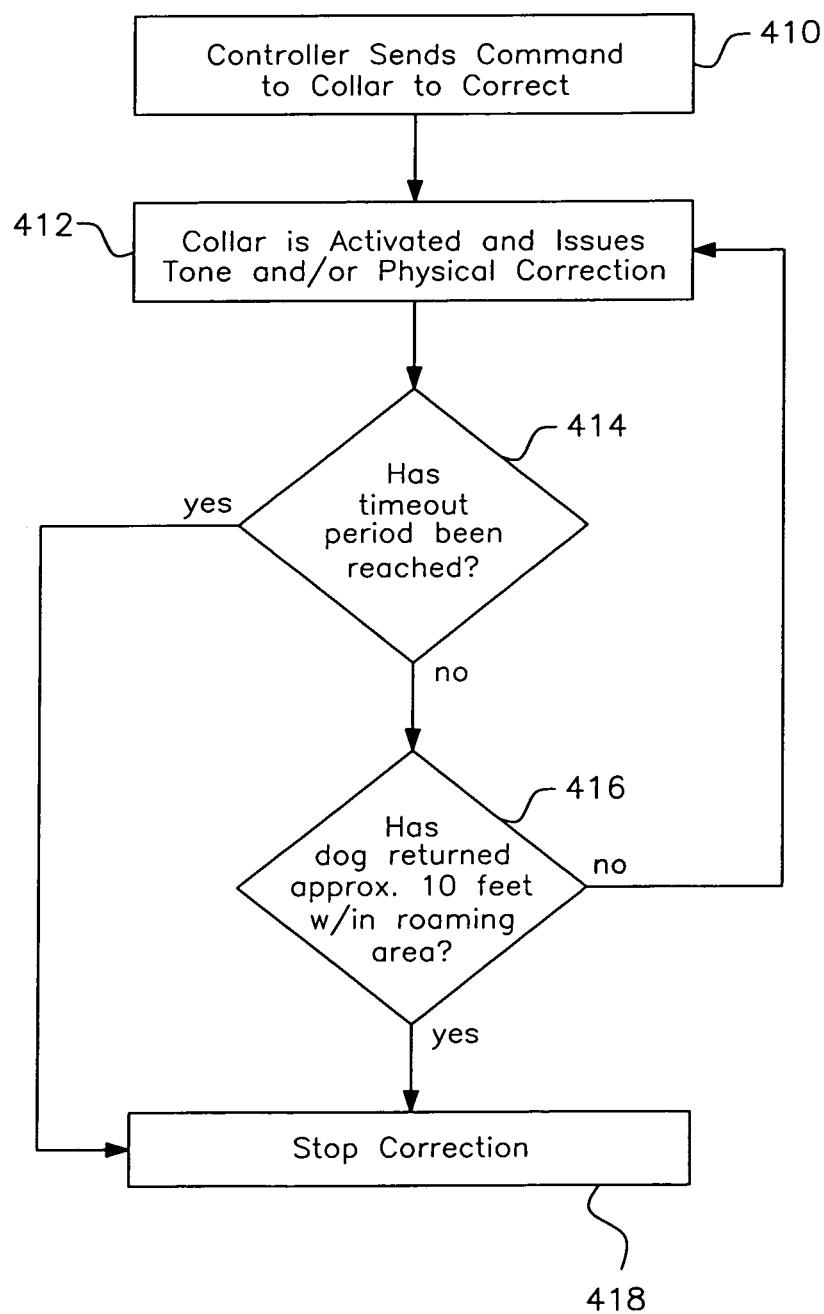

CUSTOM-SHAPE WIRELESS DOG FENCE SYSTEM AND METHOD

This application claims the priority of provisional application Ser. No. 61/344,074, filed May 18, 2010, and also the priority of provisional application Ser. No. 61/457,075, filed Dec. 21, 2010.

BACKGROUND OF THE INVENTION

1. Field of the Invention

The present invention is related to the field of animal containment and, more particularly, to a system and method for defining a wireless dog fence that surrounds a user-defined area and for using the fence to contain one or more dogs within the user-defined area.

2. Description of the Related Art

Containing one or more dogs within a prescribed area has been achieved in many different ways, most traditionally through the construction of a fenced enclosure that is high enough to prevent the dog from escaping the enclosure by going over the fence. Since some consider above-ground fencing to be unattractive or otherwise undesirable, "invisible" fence products have been developed that rely on a wire buried underground that defines a desired "fence" border for the dog or dogs. The wire transmits a signal that activates a specially designed collar worn by the dog when the dog comes within a certain proximity of the border. The collar, once activated, can issue an audible warning and/or an electric shock to the dog to ensure that the dog does not leave the "fenced-in" area. Buried wire systems are labor intensive to install. Further, since the wire may be unintentionally cut, or otherwise damaged, such as by digging or tilling during lawn maintenance or the like, such buried wire fence systems are also labor intensive when attempting to find the location of the broken wire or other difficulty.

More recently, wireless fence products have been developed that radiate a low frequency signal to saturate a spherical volume which translates to a generally circular area on the ground plane. The radius of the circle is user-definable and, according to one such product manufactured by PetSafe, generally extends radially from about 5 feet to about 90 feet. When the dog, while wearing a specially designed collar, is "inside" the signal saturated area, the collar receives a signal and no action is taken. When the dog moves outside the signal area, however, the collar delivers a correction signal.

Another wireless system is that marketed by Perimeter Technologies, Inc. which, rather than creating a signal-saturated area, uses a distance measuring technology between the collar and a base unit to determine the range of the dog from the base unit. However, interference created by objects often found within a household environment can cause the collar and base to lose communication with one another, resulting in undesired corrections being delivered to the dog, i.e., corrections when the animal is within the defined containment radius. In addition, the Perimeter Technologies system is also limited to a generally radial or circular area which does not allow the user to make allowance for specific geographic or other individualized aspects of the area within which the dog is to be contained.

In view of the desirability of a custom-shaped fence, U.S. Pat. No. 7,259,718 ("the '718 patent") discloses an electronic pet fence that allows the user to establish a desired boundary having a user-defined shape. Using a master and two slave transceivers arranged in a triangular configuration, the master transceiver communicates with the slaves and records round trip travel times for radio signals between the collar and each of the transceivers. A logic device at the master transceiver uses these round trip times to determine the location of the collar using triangulation or trilateration. However, in a household setting, problems often arise with signal attenuation and signal loss such that one of the transceivers may, at any given time, be out of communication with the collar. This results in the inability to locate the collar and often the issuance of an inappropriate correction to the dog. Furthermore, the '718 patent provides no means of preventing fence border irregularities caused by signal attenuation during set up, and also lacks any ability to identify and ignore erroneous collar location data collected while the system is in use. Such erroneous data, if not detected for what it is, can also result in unwanted corrections being issued to the dog.

Accordingly, a need exists for an improved wireless fencing system that is easy for the consumer to set up and use and that overcomes the problems encountered with prior art systems.

SUMMARY OF THE INVENTION

In view of the foregoing, one object of the present invention is to overcome the difficulties of containing a dog within a wireless fence boundary without administering unwanted corrections to the animal.

Another object of the present invention is to provide a wireless fence system having a dual-antenna collar and a plurality of dual-antenna base units to improve the ratio of successfully received signal transmissions to lost signals.

Yet another object of the present invention is to provide a wireless fence system having a plurality of base units that enable a custom border or fence to be defined by the user to establish a uniquely-shaped containment area and to enable the user to track the specific location of the dog within the containment area at any given time.

Still another object of the present invention is to provide a wireless fence system in accordance with the preceding objects that includes visualization software that allows the user to validate visually, on a personal computing device having a display screen, the perimeter of the fence, the occurrence of a breach of the fence perimeter, and the actual position of the collar relative to the fence perimeter as the collar, whether on the dog or in the user's hand, moves about. The visualization software can be used during system set-up and at any time thereafter during system operation to check the fence location, and to review a "bread crumb" history of the movement of the collar as recorded by the software.

A further object of the present invention is to provide a wireless fence system in accordance with the preceding objects in which the visualization software records a digital log file containing a historical record of the range pair distance values between the bases determined during a topology set-up phase, the fence and exclusion zone locations, as well as tracking location values for the collar over time which can be used to troubleshoot the system when needed.

A yet further object of the present invention is to provide a wireless fence system in accordance with the preceding objects in which the plurality of base units allow the user to define specific areas within the containment area that the dog is not allowed to enter as exclusion zones.

Yet another object of the present invention is to provide a wireless fence system in accordance with the preceding objects in which distance values are repeatedly obtained between the base units and a collar unit and then weighted and filtered to discount those distance values likely to be errant and to more accurately track where the dog is within the containment area.

A still further object of the present invention is to provide a wireless fence system in accordance with the preceding objects in which NANOLOC™ chipsets are used in conjunction with power amplification circuitry to provide greater signal strength for improved reliability in tracking the location of the dog within the containment area.

Yet another object of the present invention is to provide a wireless fence system in accordance with the preceding objects in which the collar includes a normal operating mode and a sleep mode that is entered when lack of motion is detected for a threshold time period.

It is yet another object of the invention to provide a wireless pet containment product that is user friendly and robust in operation and which effectively tracks the location of the dog to reduce the number of inappropriate corrections administered to the dog.

In accordance with these and other objects, the present invention is directed to a custom-shape wireless fence system for containing one or more dogs in a user-defined containment area without the need for a physical fence or underground buried wire. The system includes a plurality of base units, a user interface device or remote controller, and at least one collar for a dog, with multiple collars also being supported for additional dogs. The base units include a master base unit and preferably at least three slave base units or anchors. By including four base units rather than just three, the incidence of dropped signals or lost communications is reduced, improving system performance. Each of the master base unit, the anchors and the collar have two antennas each, providing diversity and further improving the ratio of successfully received signal transmissions to lost signals. Each of the base and collar units also includes a NANOLOC™ transceiver.

According to the present invention, the border or boundary line can follow any path the user defines in order to create a custom-shape suited to the user's particular yard or other area. As used herein, "custom-shape" refers to a user-defined border that can have virtually any shape as set by the user during initial installation. The border represents an approximate area outside of which the collar will begin to initiate a correction to the dog. The border marks the start of a trigger zone which extends outwardly from the border in all directions to a distance at which the collar can no longer receive input from the master base unit. This distance, and hence the "size" of the trigger zone, will vary depending upon the terrain and objects between the dog and the master base unit, but can be as much as about a mile and a half from the master base unit in open flat country.

The border, which is set by the user, defines a roaming area. As long as the dog remains within the roaming area, signal transmissions are effectively sent and received between the base units and the collar to monitor the dog's position in the containment area in real time, and no corrections are issued to the dog. Also as used herein, the "fence" is a group of connected line segments that extend coincidentally with the border or boundary line immediately inside the trigger zone.

The master base unit and the three anchors are mounted inside the user's house or other desired indoor location and are preferably positioned in approximately the four corners of the house. To set up the system using a set-up menu on a display screen of the remote controller, the user first "finds" the master base unit. Finding the master base unit is a process by which, in response to user input to the remote controller, the master base unit initiates communication with the remote controller and learns and stores the unique media access control (MAC) address of the remote controller. The user then continues with the set-up menu to "find" the first anchor, a process by which, in response to user input to the remote controller, the master base unit begins a communication sequence searching for a compatible device other than the remote controller. Once the first anchor is found, the master base unit stores the first anchor's unique MAC address and checks the distance from the master base unit to the first anchor to verify that the first anchor is a "valid" base unit, i.e., is a base unit that is part of the user's system and not, for example, a base unit belonging to a neighbor's system. This distance is obtained through a ranging process performed by the NANOLOC™ transceivers. The foregoing process by which the first anchor is "found" is repeated for each of the second and third anchors.

Once all of the anchors have been found, the master base unit initiates a topology process by which the master base unit records the relative distances between each base unit/anchor and anchor/anchor pair for a total of six distances, i.e., master base unit to first anchor, master base unit to second anchor, master base unit to third anchor, first anchor to second anchor, second anchor to third anchor, and first anchor to third anchor. Using these distances, the master base unit configures a planar coordinate system in which the positions of each of the anchors and the master base unit are assigned coordinates that identify the relative distances and spatial relationships between each of the anchors and the master base unit to define an overall topology.

Once the topology is complete, the user defines the desired containment area by placing a plurality of flags at approximately six foot intervals along the desired border or boundary line. After pressing "start" on the remote controller, the user then walks along the flagged boundary line with the remote controller in hand. The master base unit and anchors track the remote controller and the master base unit records the consecutive positions thereof as the user walks around the border or boundary line. The consecutive positions are recorded as a plurality of tracking location values that represent the end points of the line segments that will represent the fence border.

To enable the user to verify that the wireless fence actually created during system set-up conforms with the fence the user intended to create, the system preferably includes visualization software operable with a personal computer (PC) or other computing device having a display screen. The visualization software provides a visual validation of the fence as actually constructed by the user by displaying the fence, along with the base units and their relative positions, on the PC display screen. The user can then make any adjustments in the fence location that are deemed necessary as a result of the computer-displayed fence.

The system also allows the user to define exclusion zones within the containment area. Exclusion zones are specific areas or islands that, while enclosed by the fence border, do not constitute part of the roaming area, i.e., exclusion zones are areas that the user does not want the dog to access. Establishment of the exclusion zones is accomplished in a manner similar to that followed when establishing the fence border. Specifically, the user defines one or more exclusion zone by placing a plurality of flags at approximately six foot intervals along the desired border of the exclusion zone. After entering the exclusion zone mode and pressing "start" on the remote controller, the user then walks along the flagged exclusion zone boundary line with the remote controller in hand. The master base unit and anchors track the remote controller and the master base unit records the consecutive positions walked by the user as a plurality of tracking location values that represent the exclusion zone border. Like the fence, the exclusion zone boundaries are also recorded and displayed when using the visualization software.

With the boundaries set, one or more collars 14 are added via user input using the remote controller. The collar is powered on and the master base unit seeks an enabled device that has not been previously added to the system. Upon finding the collar, the base identifies the unique MAC address associated with the collar, and stores the collar's identity in the same manner as the anchor identities were stored. The user can use the remote controller to not only add but also name, delete or change settings for each of a plurality of collars.

Once the fence is set and the collar or collars activated, the flags identifying the fence and the exclusion zones may be used as visual cues of their respective locations. The user can then train the dog as to the extent of the roaming area so that the dog can be effectively contained within the fence and kept out of the exclusion zones. When the trained dog wearing the collar is thereafter placed within the roaming area, the location of the collar with respect to the coordinate system is continually calculated and updated as the anchors range with the collar and communicate their respective range or distance values to the master base unit on an on-going basis. As used herein, "range" or "ranging" refer to distance determination so that when the collar ranges with a base unit, the distance between the collar and the base unit is being determined.

Once obtained, the distance values are weighted and filtered by the master base unit to discount those distance values likely to be errant due to their disparity with previously measured values and previous calculations of the dog's position. More particularly, through weighting and filtering of a plurality of continuously obtained distance measurement values taken between the base units and the collar, anomalous measurement values are discounted in terms of their contribution to the current calculation of the dog's location. In addition, smoothing of the location data is performed through time and motion algorithms based on modified Kalman filtering and hysteresis to smooth both the border during fence set up and motion tracking of the dog in use of the system. This smoothing takes into account positional tolerances inherent in the relative accuracy limitations of the NANOLOC™ chipsets. These filtering techniques in combination with improved signal strength and antenna diversity in the communication between the base units and the collar improve the accuracy with which the dog's location is tracked so that unwanted corrections are not administered to the dog.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 4 is a flowchart showing the steps performed by the topology algorithm shown in FIG. 3.

FIG. 5A is a flowchart of the steps taken during the fence setting mode of the system shown in FIG. 1.

FIG. 6 is an illustration of a user's yard with the fence being set up as described in FIG. 5A.

FIG. 7 is a flowchart of the steps taken during the exclusion zone setting mode of the system shown in FIG. 1.

FIG. 9B is an exploded view of the components of the collar shown in FIG. 9A.

FIG. 10 is a flowchart showing the steps taken during the collar setting mode of the system shown in FIG. 1.

FIG. 14 is a flowchart showing the steps taken during the system monitoring mode of the system shown in FIG. 1.

FIG. 15 is a flowchart showing the steps taken during the tracking process of the system shown in FIG. 1.

FIG. 16 is a flowchart showing the steps taken during the correction process of the system shown in FIG. 1.

DETAILED DESCRIPTION OF THE PREFERRED EMBODIMENTS

Figure 1:
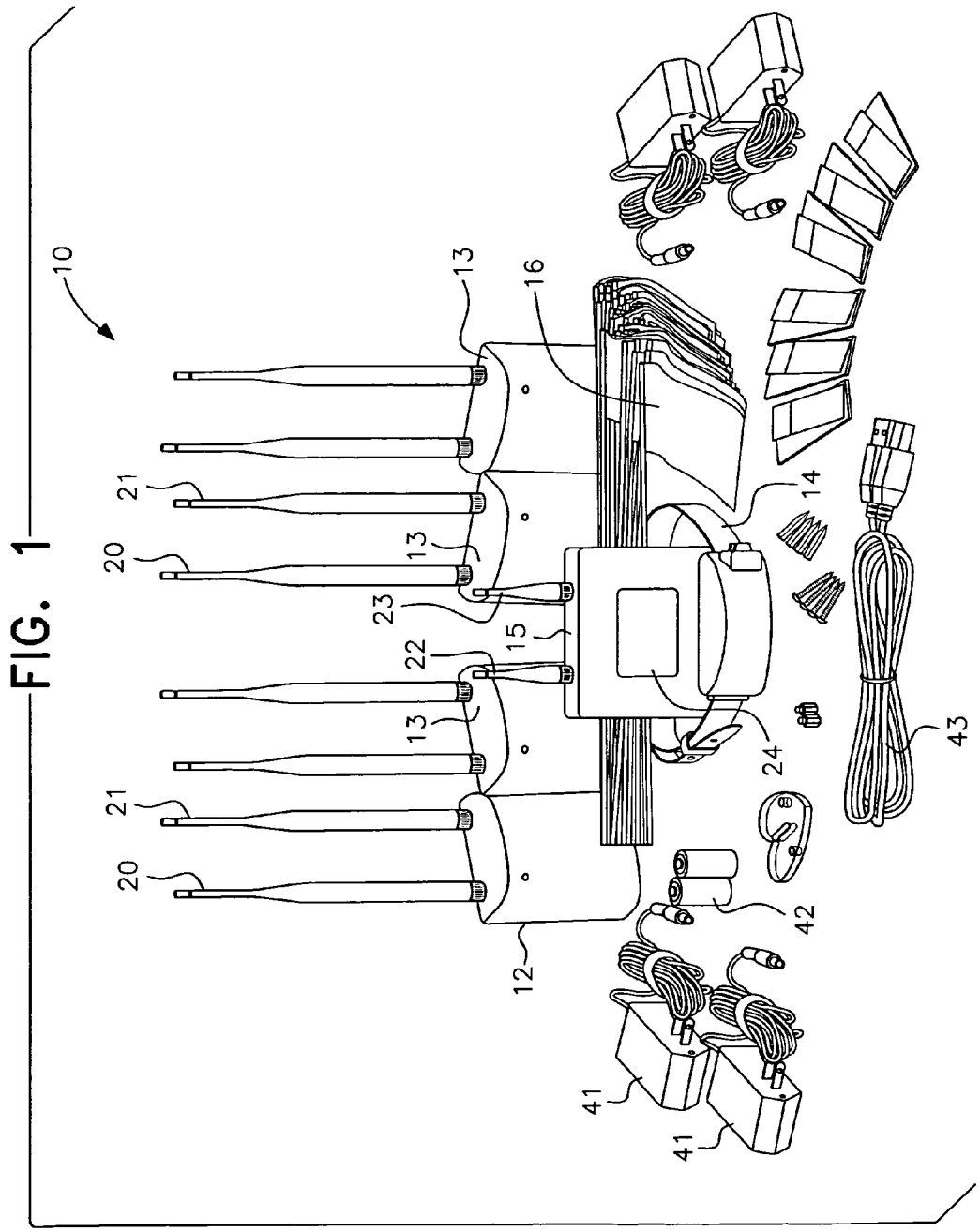
FIG. 1 shows the components of a custom-shape wireless fence system in accordance with the present invention.

In describing a preferred embodiment of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar purpose.

According to the present invention generally designated by reference numeral 10, a custom-shape wireless fence system is provided that includes a master base unit 12, at least two other slave base units or anchors 13, a collar 14 and a remote controller 15, as shown in FIG. 1. Preferably, three slave base units are provided and the system as described hereinafter includes three slave base units in addition to the master base unit; however, the system only requires a total of three base units. In addition, the system may be configured without the remote controller as a separate unit. When configured without a remote controller, the collar or other trackable device is used to define the fence and exclusion zones, and other functions of a remote controller may be incorporated into the master base unit and/or PC used with the visualization software. Accordingly, while reference herein is generally made to a remote controller, it is to be understood that another properly configured trackable device may be used in lieu of a remote controller depending on system configuration.

For the purposes of training the dog and to provide visual markers for both the dog and the user that generally correspond with the fence border, a set of flags 16 is also preferably provided with the system. The number of flags may be variable, but it is preferred to have from about 25 to about 100 flags, depending upon the size of the containment or roaming area 32 (see FIG. 6) to be defined.

The base units each have a power supply 41 that plugs into a 110 volt household outlet. The remote controller 15 is preferably recharged using a USB cable 43. The collar uses disposable or rechargeable batteries 42.

Figure 2:
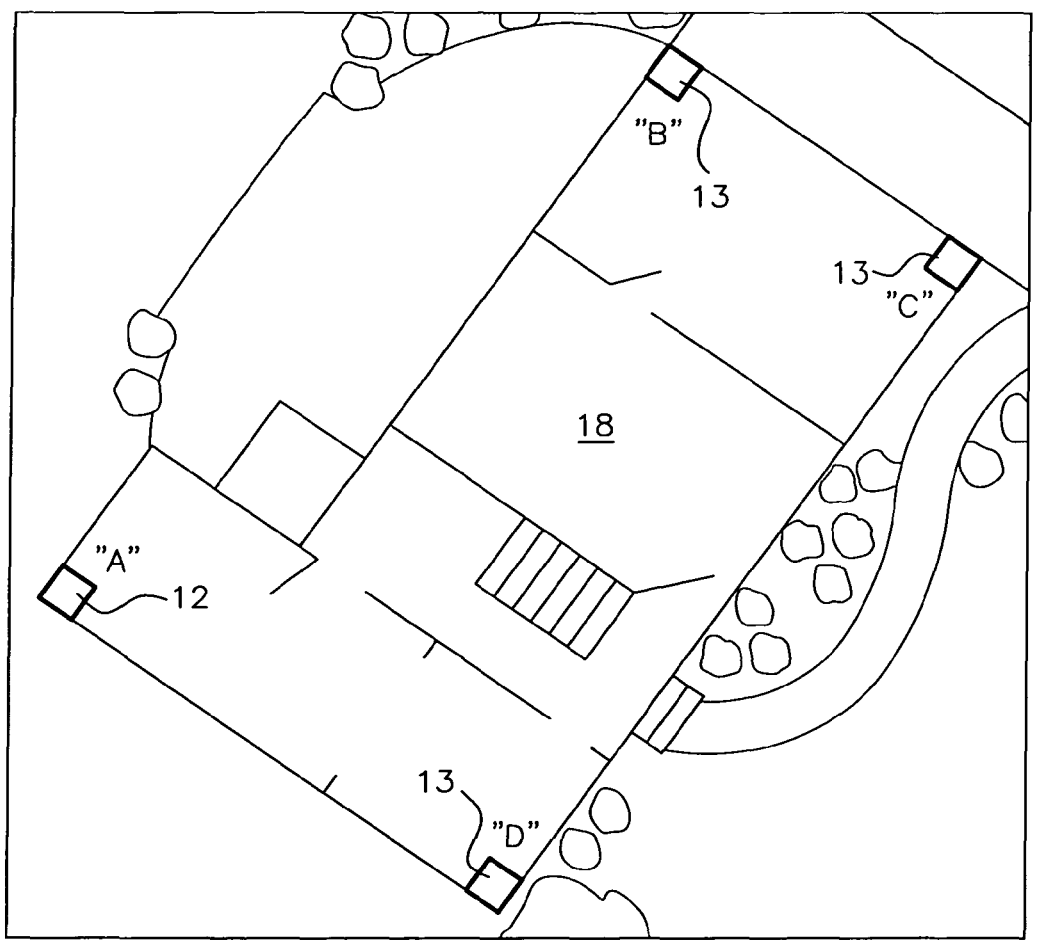
FIG. 2 is a top plan view illustrating the master base unit and the three anchors shown in FIG. 1 as mounted within the four corners of a house.

As shown in FIG. 2, the base units 12 and 13 are intended to be positioned within the user's home 18, garage, or other environmentally controlled, indoor area, and are preferably configured to be mounted on a wall. While it is possible to power the base units with batteries, they are preferably plugged into a properly grounded 110V AC outlet. Each base unit preferably has two antennas 20, 21 for diversity when communicating with the collar 14 and with the remote controller 15; however, the base units may be configured with only a single antenna each. The remote controller 15, which is preferably powered by batteries, also preferably has two antennas 22, 23, as well as a graphic user interface with a touch screen 24 for inputting information to set up and control the system. The remote controller 15 is configured to enable the user to set up a custom-sized fence of up to about 1000 feet or more from the master base unit and the anchors in any direction. The fence encloses an inner roaming area 32 and establishes the border at which the trigger zone 34 begins.

The base units 12, 13 range with the collar 14 using an integrated circuit (IC) chip contained within each of the base units. The collar also contains a similar IC chipset. According to a preferred embodiment, the chipset in each of the base units and the collar is a NANOLOC™ TRX 2.4 GHz transceiver chipset sold by Nanotron Technologies of Berlin, Germany. The NANOLOC™ TRX 2.4 GHz transceiver chipsets use chirp spread spectrum (CSS) wireless communication technology.

As preferably configured, the master base unit 12 stores location data and coordinates messages to be sent to the collar and/or to the remote controller. The master base unit 12 communicates with all five other devices (three anchors, collar and remote controller). The anchors 13 may be less complex distance measuring devices which range with each other as well as with the master base unit 12, the collar 14 and the remote controller 15. The remote controller 15 also ranges with the anchors and, in addition, has two-way communication with the master base unit. The collar ranges with all four base units and, like the remote controller, sends to and receives signal communications from the master base unit.

As shown in FIG. 2, the process of setting up the system according to the present invention begins by mounting the base units 12, 13 inside the user's home 18, preferably in the four corners. The user then follows a sequence of steps using a control mechanism, preferably the remote controller 15, that enables the master base unit 12 to determine the location of the other three base units or anchors 13 within a predefined planar coordinate system that is part of the overall system. A topology is thus defined by which the positions of each of the anchors and the master base unit are assigned coordinates that identify the relative distances and spatial relationships between each of the anchors and the master base unit within the predefined planar coordinate system.

Figure 3:
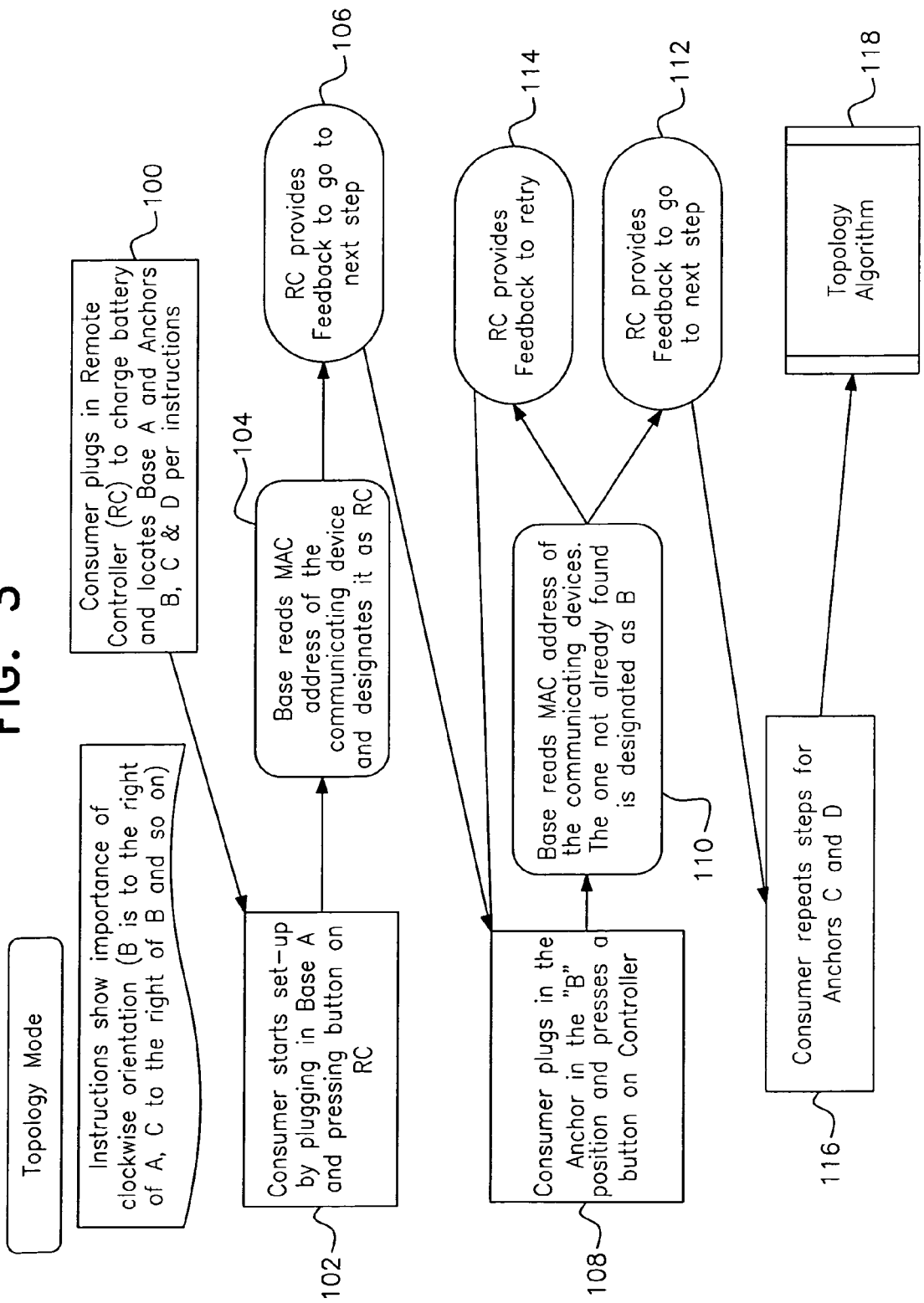
FIG. 3 is a flow chart of the steps taken when establishing the user-defined topology of the containment area for the system shown in FIG. 1.

The steps taken when establishing the topology are summarized in FIG. 3. In FIG. 3, the master base unit is referred to as "Base A" and the anchors are referred to as "Anchors B, C and D". When designating which of the anchors is B, which is C, and which is D, the system is configured to assume a clockwise orientation of the base units as seen from above as in FIG. 2. Therefore, Anchor B is to the right of or clockwise with respect to Base A, Anchor C is to the right of or clockwise with respect to Anchor B, and Anchor D is to the right of or clockwise with respect to Anchor C, as designated in FIG. 2.

To begin, the user plugs in the remote controller 15 to charge the batteries therein, step 100, and then plugs in Base A (the master base unit 12), step 102. Using the touch screen 24 on the remote controller, the user instructs the remote controller to "find" the master base unit, step 102. This starts a communication sequence between the remote controller 15 and the master base unit 12 during which the master base unit reads and stores the unique MAC address of the remote controller, step 104. The remote controller then prompts the user to go to the next step, step 106.

As already noted, the first anchor, Anchor B, is the slave base unit that is next to, and to the right of, the master base unit when moving clockwise with respect to all of the base units. After powering up Anchor B, the user proceeds to "find" Anchor B through appropriate input using the touch screen of the remote controller, step 108. When instructed to "find" Anchor B, the master base unit begins a communication sequence seeking the next compatible device (other than the remote controller). The master base unit reads the unique MAC address of both the remote controller and Anchor B and identifies the address not already found as Anchor B, step 110. If Anchor B is successfully found, its distance to the master base unit is checked through a ranging process performed by the NANOLOC™ tranceivers, as will be discussed further hereinafter, to verify that Anchor B is a "valid" base unit. A base unit is "valid" if the distance indicates that the base unit is part of the user's system, i.e., if the distance is within a maximum allowable distance. This check for validity ensures that any other units that might be in the area, such as base units that are part of a neighbor's fence system, are not "found" and erroneously made part of the user's system. If Anchor B is valid, the master base unit stores the MAC address of Anchor B. The remote controller then prompts the user to go to the next step, step 112. If Anchor B was not found, the remote controller will prompt the user to retry, step 114. The foregoing steps used to "find" Anchor B are then repeated for each of Anchors C and D, step 116.

Once all of the anchors have been found, the master base unit initiates a topology process within the localized planar coordinate system using a topology algorithm, step 118. The topology process is based on the assumption that the four base units are set up to form a four-sided polygon, i.e., the base units are not arranged in a straight line.

The steps performed by the topology algorithm are summarized in FIG. 4. First, the master base unit 12 records the relative distances between each base unit/anchor pair and each anchor/anchor pair for a total of six distances, i.e., master base unit 12 to first anchor (Anchor B), master base unit 12 to second anchor (Anchor C), master base unit 12 to third anchor (Anchor D), first anchor (Anchor B) to second anchor (Anchor C), second anchor (Anchor C) to third anchor (Anchor D), and first anchor (Anchor B) to third anchor (Anchor D), step 120. A set of approximately 40 distance values is obtained for each pair of base units, with the sets then being respectively filtered and averaged to yield a single distance value for each base unit pair. With these distance values, the topology algorithm determines the spatial relationships of each of the four base units within the localized planar coordinate system or reference grid, step 122.

When determining the above spatial relationships among the four base units 12, 13, there is a chance that attenuation seen within a given home environment may skew the calculated base/anchor spatial relationships. To address such situations, the system is preferably configured to enable the user to override the "found" distances for each of the six distances with a user-entered distance. In this case, the user-entered or "user-defined" distance (or distances) can be used by the topology algorithm rather than the "found" distance.

To orient the base units in the planar coordinate system, the position of the master base unit is defined as (0, 0), step 124. The position of Anchor B is defined as (Bx, 0), where Bx is the distance value returned between the master base unit and Anchor B, step 126. The position of Anchor C is defined as (Cx, Cy), and the position of Anchor D is defined as (Dx, Dy).

To determine the actual coordinate values of the anchors, the distance between the master base unit and Anchor C is compared with the distance between Anchor B and Anchor D. Whichever of these two distances is shorter determines which of Anchors C or D will be defined first, step 128.

Assuming that the distance between Anchor B and Anchor D is less than the distance between the master base unit (Base A) and Anchor C, then the location of Anchor D is defined first; Anchor C's calculated position is then dependent on the location of Anchor D. The position of Anchor D can be calculated with the known positions of the master base unit and Anchor B using mathematical equations. Once the position of Anchor D is calculated, the position of Anchor C is defined by Anchor C's distance from Anchor B and from Anchor D.

With respect to the position of Anchor D as (Dx, Dy), the distance between (0, 0) and (Dx, Dy) is the distance value determined between the master base unit and Anchor D, the distance between (0, By) and (Dx, Dy) is the distance value determined between Anchor B and Anchor D. These distance values are used to determine the position of Anchor D.

With respect to the position of Anchor C as (Cx, Cy), the distance between (Bx, 0) and (Cx, Cy) is the distance value determined between Anchor B and Anchor C, and the distance between (Dx, Dy) and (Cx, Cy) is the distance value determined between Anchor D and Anchor C, step 132.

Alternatively to the above described method of setting up a coordinate grid, the master base unit may be set at (0, 0) as the origin, with the furthest of the three remaining base units or anchors being placed as the diagonal location. The remaining two anchors are then placed on opposite sides of a line drawn between the master base unit and the diagonal base or anchor. This method also creates a grid that forms the reference for establishing fence and exclusion zone points.

Once the coordinate grid has been completed and the positions of the master base unit and the three anchors have been calculated with respect to the grid, the topology is complete. The user is then ready to set up the fence boundary. The fence setting mode of the present invention is summarized in FIG. 5A.

To start, the user defines the desired containment area by placing a plurality of flags at approximately six foot intervals along the desired border or boundary line, step 140. Preferably, the user begins the flag placement sequence with a single flag of a different color than the remaining flags. For example, the first flag may be blue while the other flags are white. The blue flag is thus the "start" flag 80. Such a flagged border is shown in FIG. 6.

To record the location of the fence, the user uses a trackable device which is preferably either the remote controller or the collar. Within the preferred embodiment disclosed herein in which a remote controller is included, the user initiates recording of the fence location by the master base unit by pressing "start" or other comparable input field on the touch screen 24 of the remote controller 15 while at the start flag 80 and then walks, or otherwise moves, along the flagged boundary line with the remote controller in hand, step 142. The master base unit and anchors track the movement of the remote controller and the master base unit records consecutive positions thereof as the user walks as a plurality of fence location values (FLVs) that represent the fence border.

According to a preferred embodiment, in formulating the fence in memory, the system of the present invention joins two consecutive fence location values by a straight line segment, such that the fence 31 is actually a series of connected line segments that are mathematically defined and stored in memory at the master base unit, step 144. If the user has to interrupt the fence setting process for some reason, the system includes a pause and resume feature, step 146. Once the user has completed walking around the border and has reached the end flag 82, an appropriate input to the remote controller indicating fence completion causes the system to "close" the fence, i.e., to join the fence location values of the first and last points as respectively represented by the start and end flags 80 and 82, step 148.

To better ration memory space, the system preferably is configured to use every third fence location value as an endpoint to the joined line segments, step 150. Since the fence location values are recorded at a rate of about one per second, as dependent upon the walking speed of the user, there is no appreciable degradation in the smoothness of the fence line 31 when a slow to normal walking pace is employed while recording the fence location. Similarly, the system may be configured to join every fourth fence location value, every fifth value, etc.

To enable the user to verify that the wireless fence actually created during fence set-up conforms with the fence the user intended to create, the present invention preferably includes visualization software that provides a visual validation of the fence as constructed by the user. This visual validation not only enables the user to "see" the fence perimeter created during the fence set-up procedure, but also to identify problem areas or irregularities that may not have been recognized by the user when recording the fence location values that define the fence perimeter. For example, the presence of an interfering object such as a refrigerator or other signal-blocking object may have created an irregularity in the fence perimeter that is undesirable to the user. The visualization software shows the user this irregularity, enabling the user to make adjustments in the set up of the fence to avoid or compensate for the interfering object or other irregularity.

Accordingly, the visualization software is activated and used during initial fence set-up. Specifically, the software is downloaded onto the user's PC or other computing device having a display from a website or from a CD or similar data storage element. The download may be completed by connecting the master base unit to the PC either directly through a USB cable or wirelessly through the remote controller 15 which is attached to the PC via a USB cable. The visualization software is then run while the wireless fence is being created. The visualization software may also be used at various times thereafter as will be discussed more fully hereinafter.

Figure 5B:
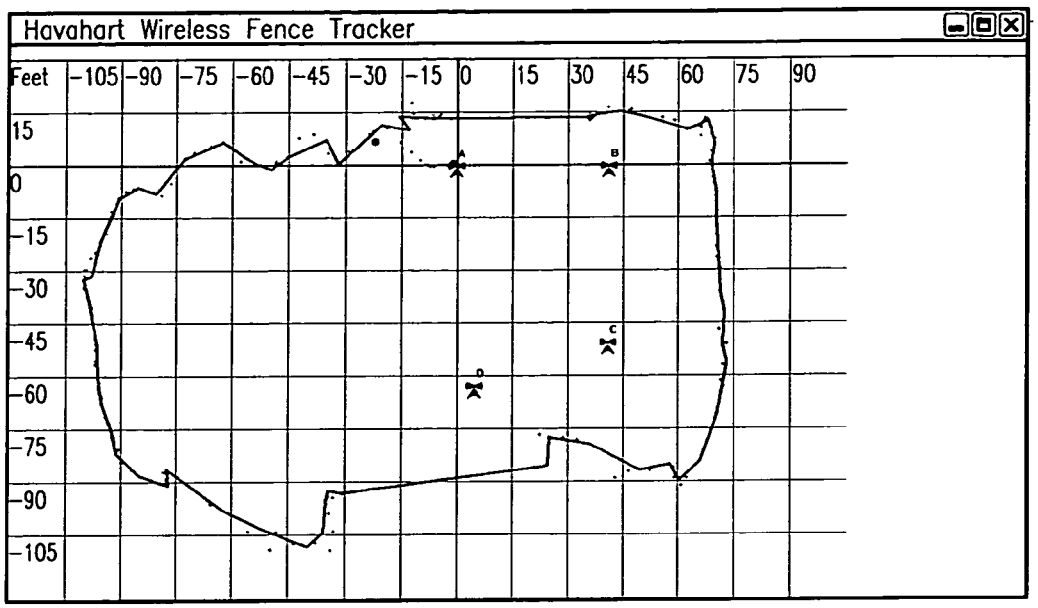
FIG. 5B illustrates the fence as displayed on the user's PC screen using visualization software.

As the fence is being defined, the software creates a visual representation of the fence which is displayed on the screen of the user's PC as shown in FIG. 5B. The visualization software preferably includes an auto-scaling feature that automatically sizes the virtual representation of the created fence to a "full-screen" view on the PC. The software also displays the base units and their relative positions and includes an on-screen grid system that permits the user to make distance measurement estimates between various points shown on the screen.

After the fence perimeter has been defined, the user can verify fence location by physically walking, or otherwise moving along the fence, while holding the collar. While walking, the real-time position of the collar, along with the history of the user's walked path relative to the fence perimeter, is displayed as a "bread crumb" trail on the user' PC screen. According to one example, the user may choose to walk the collar along a line approximately 10 feet inside the fence or flag line, and to then compare the "bread crumb" trail corresponding with the user's path as displayed by the visualization software to the fence, also shown by the visualization software. In this case, a good result, i.e., a result that indicates that the fence is where the user wants it to be, would be a "bread crumb" trail that is "concentric" with the fence but offset by the 10 feet.

Figure 5C:
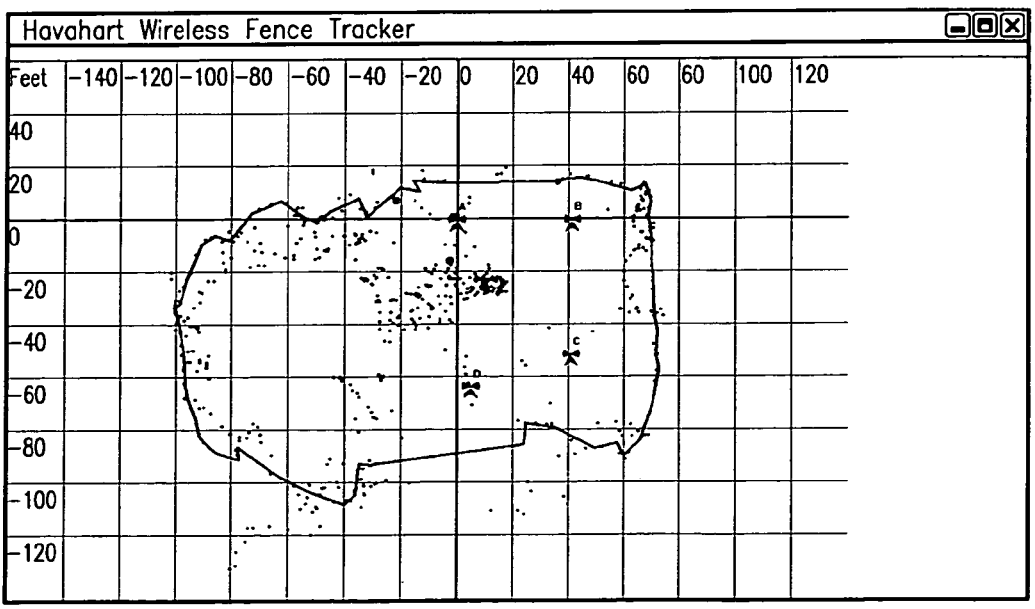
FIG. 5C illustrates a screen shot of the fence of FIG. 5B in conjunction with a history of tracking location values for the collar over a period of time.

Once the tracking portion of the visualization software starts recording, the system begins to write a log file and continues with the writing thereof until the software is closed and the log file saved. The log file can continue and accumulate for days before being saved. Once saved and then started again, a new log file is recorded and saved when the application is closed. The log file, when played back, provides a visual indication of the position and movement of the collar over the period of time that the log file is recording as shown in FIG. 5C. This record allows the user to confirm that the fence system is properly set-up and operational with respect to tracking the location of the collar.

In addition, after setting the fence perimeter the user may choose to conduct a "breach" test by walking the collar through the fence perimeter. In addition to noting the response of the collar while walking it through the fence, which should include an auditory tone and illumination of an LED on the collar, the visualization software can enable the user to view the breach in that the fence as displayed on the PC screen will change visually. According to a preferred embodiment, the fence is normally shown in green on the display screen and will change color to red when a breach is detected. Other visually discernable screen appearance changes could alternately be used to indicate the breach. Like the collar tracking visualization function, the visual change in screen appearance indicating that a breach has occurred allows the user to confirm that the fence system is properly set-up and operational with respect to tracking the location of the collar relative to the fence perimeter.

In addition to providing the foregoing visual images for presentation on the user's PC or other computing device having a display, the digital log file created by the visualization software also records valuable information that can be used by wireless fence design engineers, such as at Woodstream Corporation ("Woodstream"), the assignee of the present application, to analyze and solve any fence set-up problems or other issues experienced by the user. According to one preferred embodiment, the digital log file is designed to be easily sent by electronic mail or other file exchange technology from the user to Woodstream should further analysis and/or problem solving be required to assist the user. The digital log file includes base and anchor range values indicating the relative positions of the base units, fence location values, and location values indicating recorded movement of the collar. The digital log file also contains filter information such as distance values that exceed a maximum threshold, and "skip" decisions (see FIG. 12) resulting from too few or no distance values being reported.

More particularly, the log file is useful when troubleshooting the fence system as the playback of the recorded information allows the troubleshooter to see if a base or bases were having difficulties in ranging or communicating with a collar in certain locations of the yard. In the event that such difficulties are noted where they would not be expected, as when both base units are on the same side of the house, the troubleshooter can surmise from the log file that there is an attenuating object near the base unit, usually on the outside of the house, and can instruct the user to move that base unit to a different location. The log file also allows the troubleshooter to see if one of the base units is not powered or is not communicating at all, if the fence was started inside the home by mistake, or if there were other issues relating to tracking decisions in which range values were lost, skipped, filtered out, etc. The log file data can also be compared with information obtainable from public satellite services for congruency which, in the event of discrepancies, can enable the user to make corrections through manual entry of base unit location and range information.

With the fence complete and recorded in memory, the flags may thereafter be used as visual cues of the location of the fence and, with the collar on the dog, the user can then train the dog where the fence border is so that the dog can be effectively contained therein.

Figure 8:
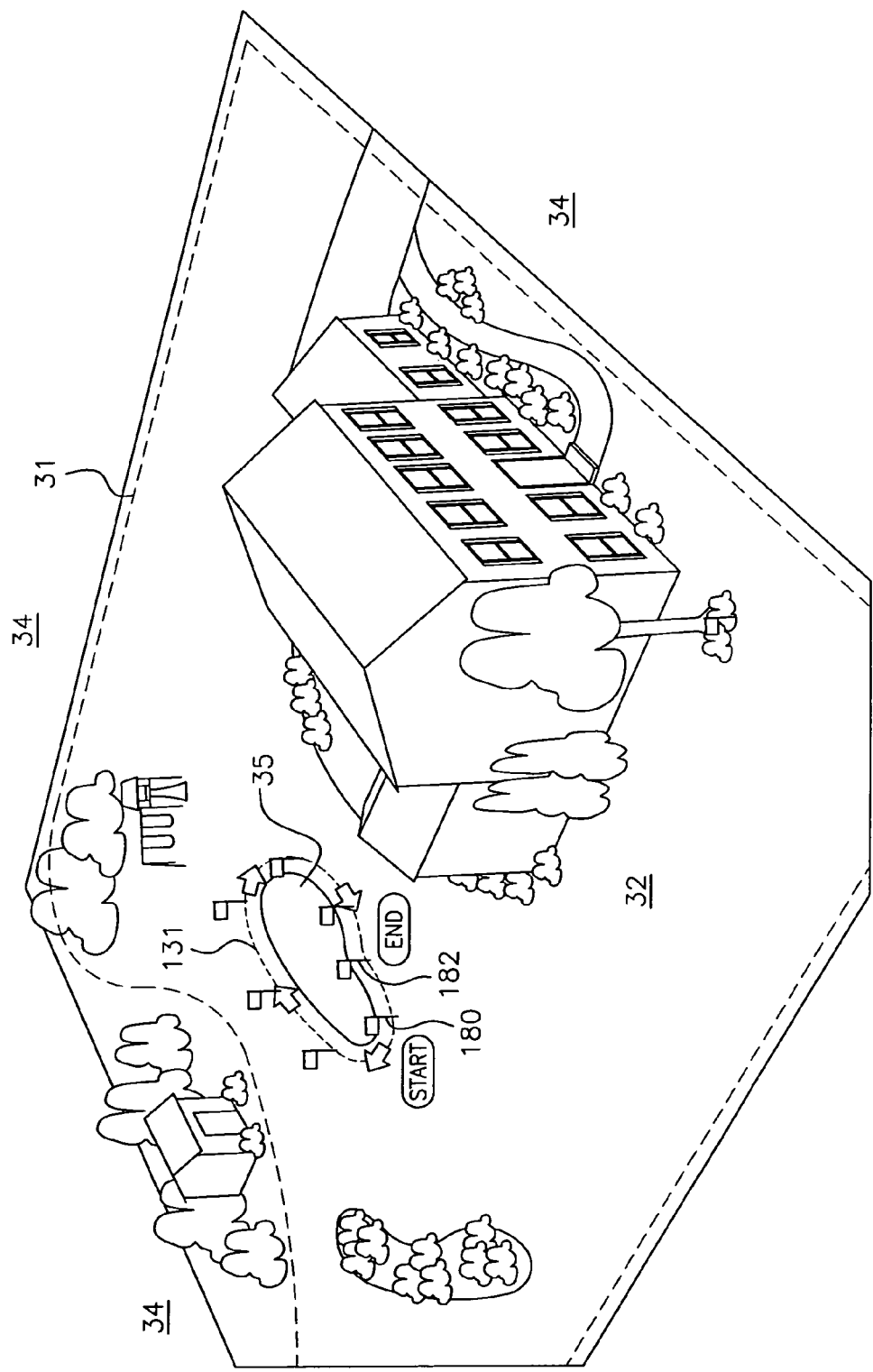
FIG. 8 is an illustration of the user's yard shown in FIG. 6, with the exclusion zone being set up as described in FIG. 7.

The system also allows the user to define exclusion zones 35 within the containment area, as summarized in FIG. 7 and shown in FIG. 8. Exclusion zones 35 are specific areas or islands that, while enclosed by the fence border 31, do not constitute part of the roaming area 32, i.e., exclusion zones are areas the user does not want the dog to access. Establishment of an exclusion zone 35 is accomplished in a manner similar to that followed when establishing the fence border. The visualization software allows the user to see the exclusion zones on a PC display and to perform all of the other operations described above in connection with the establishment of the fence in like manner.

Specifically, and with reference to FIG. 7, the user defines one or more exclusion zones by placing a plurality of flags at approximately six foot intervals along the desired border of the exclusion zone, step 160. As with the fence definition, the exclusion zones are defined using a trackable device which is typically the remote controller or the collar. If the system includes a remote controller, the user enters the exclusion zone mode and presses "start" or comparable input on the touch screen of the remote controller while by the start flag 180, and then walks or otherwise moves along the flagged exclusion zone boundary line with the remote controller in hand, step 162. The master base unit and anchors track the remote controller and the master base unit records the consecutive positions thereof walked by the user as a plurality of fence location values that represent the exclusion zone border, step 162. Upon reaching the end flag 182, an appropriate input to the remote controller indicating exclusion zone boundary completion causes the system to "close" the boundary, i.e., to join the fence location values of the first and last points as respectively represented by the start and end flags 180 and 182.

In like manner to that used when defining the outer boundary line or fence, the system of the present invention joins two consecutive fence location values, or every third or more fence location value, by a straight line segment, such that the exclusion zone boundary 131 is actually a series of connected line segments that are mathematically defined and stored in memory at the master base unit, step 164.

As with the fence flags, the exclusion zone flags may thereafter be used as visual cues of the location of the exclusion zone and, with the collar on the dog, the user can then train the dog where the exclusion zone is so that the dog can be effectively taught not to enter that area.

According to an alternative process of setting the fence, each flag location may be manually entered by the user using the remote controller as the user walks the fence border. As with the previous embodiment, the user defines the desired containment area by placing a plurality of flags at approximately six foot intervals along the desired border or boundary line. To activate the fence, the user sequentially holds the remote controller over each flag and presses an activation button, such as a "Flag Here" button, at each flag position. The system will confirm to the user when each flag has been successfully entered, allowing the user to move onto the next flag where the procedure is repeated. Once all of the flag positions have been entered, the user presses an appropriate button, such as a "Done" button on the controller. Using the same sequential process, the user can manually define the flag points around one or more exclusion zones by placing a plurality of flags at appropriate intervals along the desired border of the exclusion zone and then activating each flag in the same manner as the flags used in the fence boundary were activated. Both when defining the fence boundary and any exclusion zones, the system is configured to allow the user to remove individual flag positions, such as by pressing an "Undo Last Flag" button on the controller, and to also remove an entire boundary using a "Remove Fence" or "Remove Exclusion Zone" input displayed on the controller. Individual exclusion zones may also be deactivated and then reactivated, without removing the exclusion zone, whenever desired by the user.

Figure 9A:
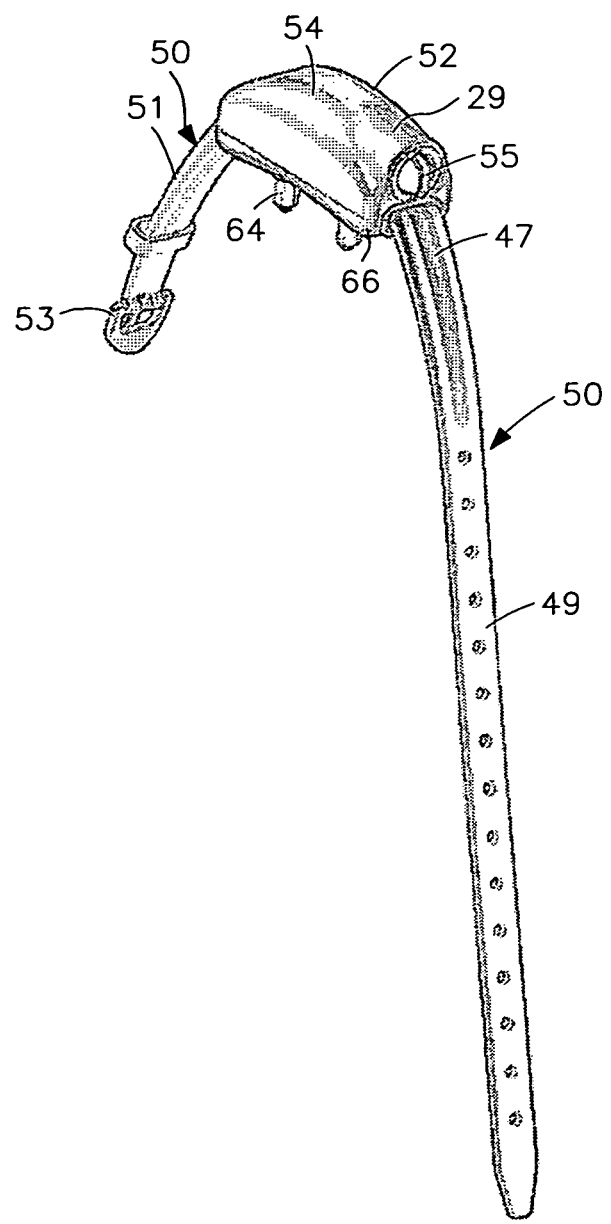
FIG. 9A is an isolated view of the assembled collar shown in FIG. 1.

As shown in FIGS. 9A and 9B, the collar 14 includes a strap generally designated by reference numeral 50 that is fitted around the dog's neck and a correction unit 52 mounted to the strap 50. The strap 50 includes a first part 49 having holes therein that is coupled to one side of the correction unit 52, and a second part 51 connected to the other side of the correction unit 52 which has a buckle assembly 53 that can be engaged with the holes to secure the collar 14 around the dog's neck.

The correction unit 52 includes a container 29 having a lower housing 66 and an upper housing 54 with a cover 55 through which a CR123A battery 56, for example, may be inserted into the container 29 for providing power to the unit 52. The correction unit further preferably includes an indicator light 58, preferably an LED post 59 joined to the upper housing 54 with a waterproof adhesive, that is visible from the outer side of the correction unit and, like the base unit, the collar has two antennas 60, 61 to provide diversity when communicating with the base unit.

Figure 9C:
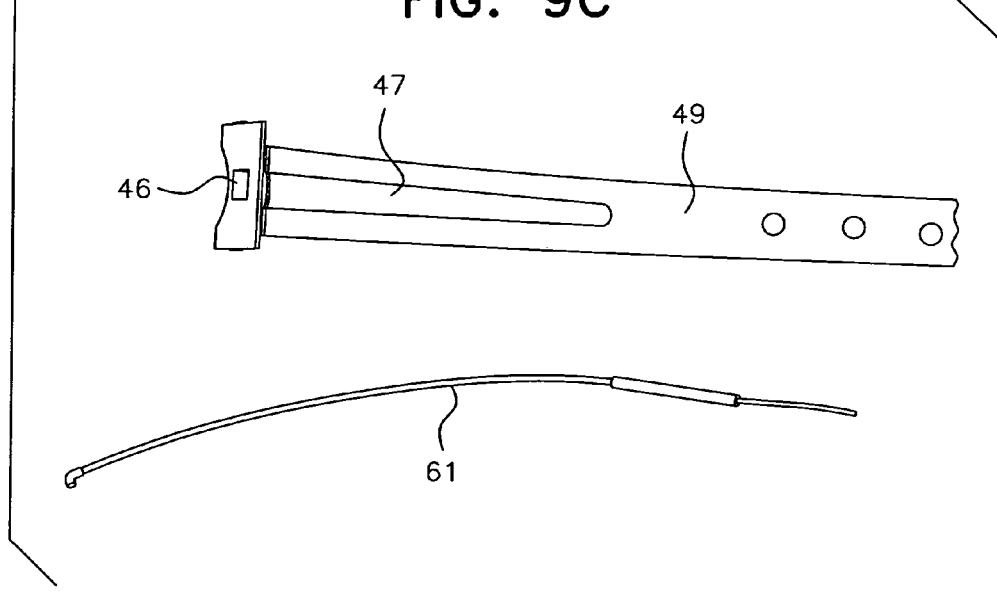
FIG. 9C is a photograph of the first strap part of the collar strap as shown in FIGS. 9A and 9B, and the antenna to be inserted into the hole in an interior end of the strap part.
Figure 9D:
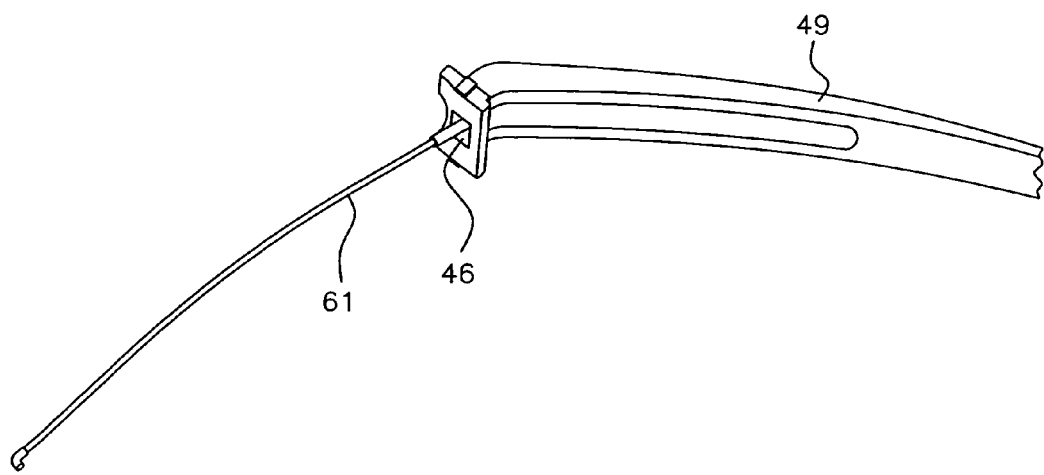
FIG. 9D is a photograph of the components shown in FIG. 9C after the antenna has been inserted into the hole in the strap.

As shown in FIGS. 9C and 9D, the antenna 61 is preferably inserted through an opening 46 and threaded into a blind channel 47 in the collar strap part 49 prior to final assembly of the collar and is secured with silicone or similar material at the strap antenna insertion points. Insertion of antenna 60 into a corresponding hole and channel in strap part 51 is accomplished in like manner.

Housed within the compartment 29 of the collar correction unit 52 is a printed circuit board (PCB) assembly 65 as shown in FIGS. 9B and 9E-9G. A NANOLOC™ TRX 2.4 GHz transceiver chipset like that in the base units is integrated with the PCB assembly 65 under RF shield 39 (see FIG. 9E). The collar and base unit NANOLOC™ chipsets send and receive radio transmissions from one another like 2-way radios. The NANOLOC™ chipsets are preferably enhanced in operation with power amplification circuitry to provide greater signal strength. When radio signals are sent from the antennas of one of the base units or the collar to the other of the communicating components, these signals propagate in an omni-directional or spherical manner. Using these signals, the enhanced NANOLOC™ chipsets perform a ranging process with their associated antenna pairs which continuously captures, filters and refines the data to yield the distance between the respective base unit and the collar at any given time, as will be described further hereinafter.

Two probes 64 extend laterally from the lower housing 66 of the container 29 that is against the dog's neck and are insulated from the housing 66 by electrode grommets 63. Shorter probes 67 can be interchangeably mounted to the lower housing 66 to better suit short-haired dogs. Depending upon the setting of the collar, the probes 64, 67 provide a physical correction signal to the dog upon reaching the trigger zone. Alternatively, the collar can be set to provide only an auditory correction signal to the dog. The physical correction signal is preferably adjustable between a plurality of levels to suit the size, age and temperament of the dog. In a preferred embodiment, the collar defaults to a tone-only correction signal.

Figure 9E:
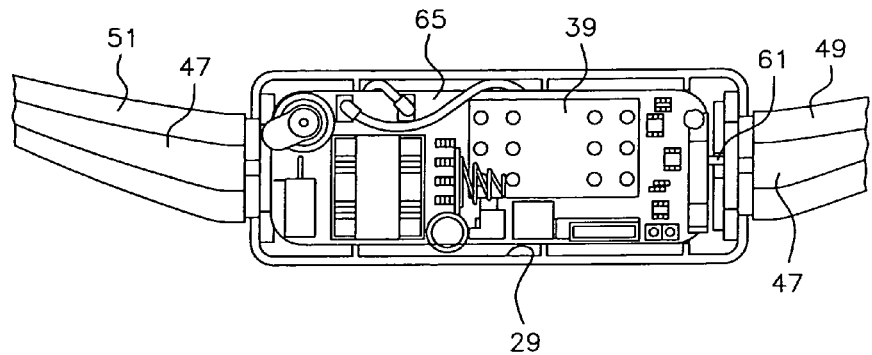
FIG. 9E is a photograph of the printed circuit board shown in FIG. 9B, as mounted in the lower housing and with the collar straps connected thereto.
Figure 9F:
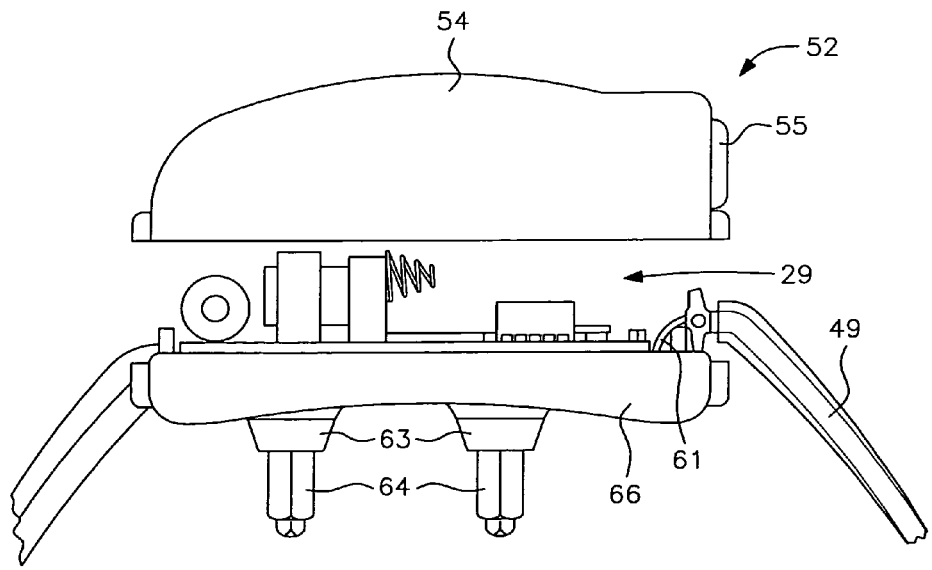
FIG. 9F is a photograph of the collar components shown in FIG. 9B, without the battery, as the upper housing is brought into alignment with the lower housing.
Figure 9G:
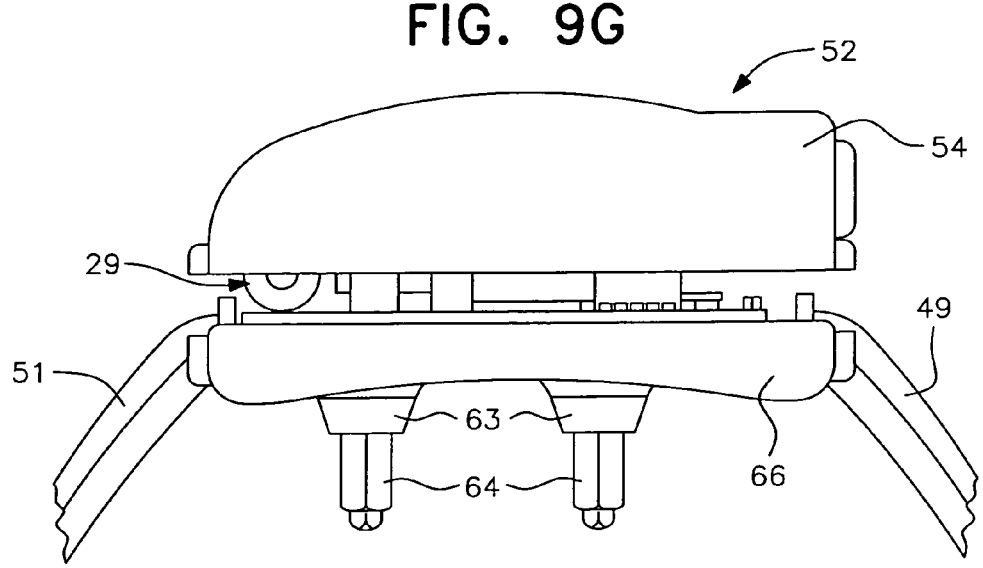
FIG. 9G is a photograph of the collar components shown in FIG. 9F, as the upper housing is brought into engagement with the lower housing to seal the correction unit compartment.
Figure 9H:
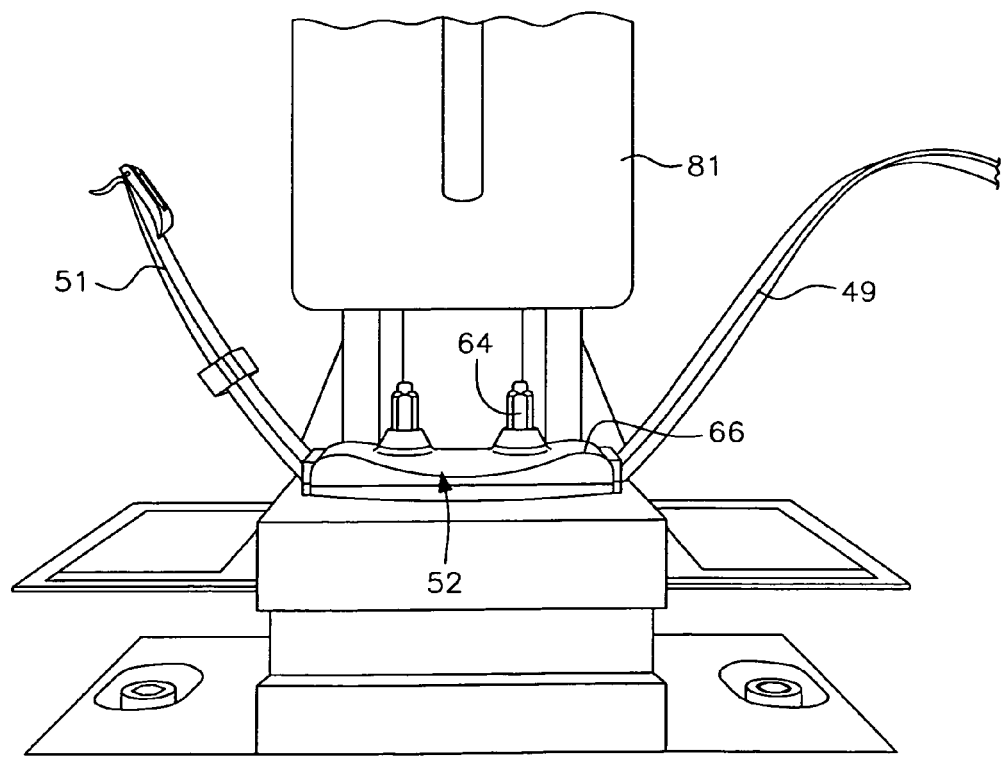
FIG. 9H is a photograph of the collar components shown in FIGS. 9F and 9G with the correction unit compartment positioned for sealing in an ultrasonic welding machine.

To assemble the collar 14, the ends of the antennas 60, 61 that extend out of the channels 47 are coupled to connectors on the PCB assembly 65, preferably with a snap-on or push-on fit. The PCB assembly is received within the lower housing 66 with the collar strap parts 49, 51 on either side of the lower housing as shown in FIG. 9E. The upper housing 54 is then brought into alignment with the lower housing as shown in FIG. 9F, and then brought closer to engage with the lower housing as shown in FIG. 9G. Once the upper and lower housing are engaged with one another to ultimately close the compartment 29, the correction unit 52 is sealed, preferably using an ultrasonic welding machine 81 as shown in FIG. 9H. Once fully assembled and welded as shown in FIG. 9A, the straps 50 and correction unit 52 are sufficiently waterproof to provide robust collar performance in all weather conditions.

The collar 14 is set up for use with the fence system of the present invention using the remote controller 15 as summarized in FIG. 10. The consumer can use the remote controller to add, name, delete or change settings for the collar, step 170. To add another collar for another dog, step 172, the user presses an input field on the touch screen of the remote controller which engages the master base unit in a seek mode. The collar is programmed to transmit so as to be detected by an enabled device when the collar is powered on. The master base unit identifies the unique MAC address associated with the collar and stores its identity. Collars can be named using the remote controller, step 174. In addition, collar correction levels and the on/off status of the collar can also be changed using the remote controller, step 176. Further, collars can be deleted using the remote controller, step 178.

Figure 11:
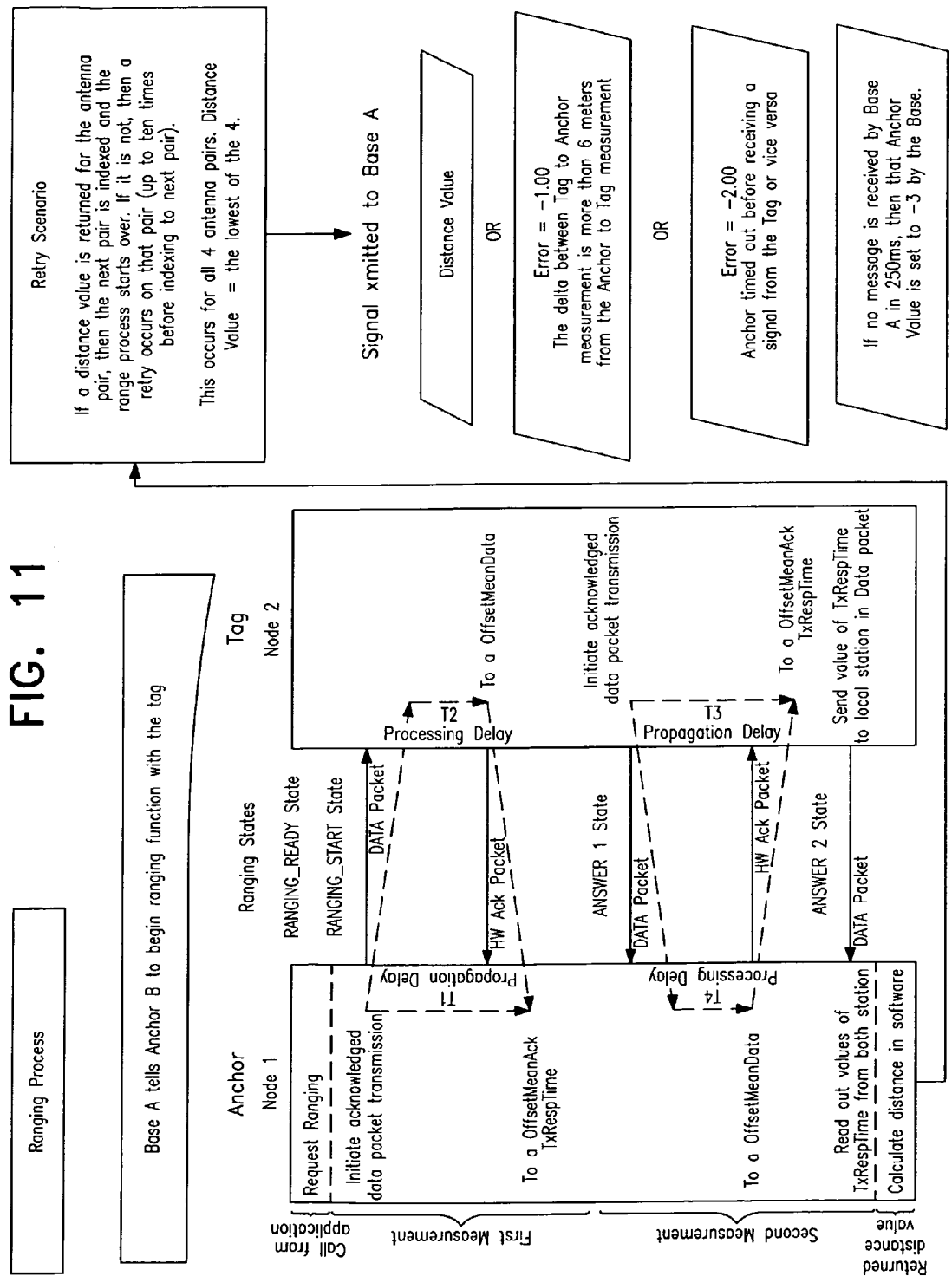
FIG. 11 is a flowchart showing the steps taken during the ranging process of the system shown in FIG. 1.

Once the collar has been set up and activated, the NANOLOC™ chipsets perform their ranging function to determine the distance between each of the base units and the collar at any given time. The ranging process is as described in connection with the NANOLOC™ chipset on the NANOLOC™ website, and is summarized in FIG. 11. Ranging occurs on an ongoing basis unless the collar is asleep. The collar sleeps on lack of motion and wakes up when motion is detected by a motion sensor integrated with the collar.

According to one embodiment, the first antenna at the master base unit determines a first distance value between itself and the first antenna on the collar, and then determines a second distance value between itself and the second antenna on the collar. The second antenna at the master base unit then determines a third distance value between itself and the first antenna on the collar, and then determines a fourth distance value between itself and the second antenna on the collar. If all four distance values are successfully determined, the actual distance value used in terms of obtaining the current calculation of the dog's distance from the master base unit is the shortest of the four measured values. The same process is performed by each of the three anchors.

The foregoing ranging process is more fully described in co-pending application Ser. No. 12/539,404, published as U.S. Publ. No. U.S. 2010/0033339 on Feb. 11, 2010 ("the '339 application"). The '339 application is hereby incorporated by reference and considered part of the instant disclosure as if fully set forth herein in its entirety.

According to a more preferred ranging embodiment, only one valid distance value is needed from one collar/base unit antenna pair in order to get a useable distance value between each collar/base unit pair. More specifically, the first antenna at the master base unit determines a first distance value between itself and the first antenna on the collar. If a value is returned to the master base unit from the first collar antenna, then that value is used as the distance between the master base unit and the collar and no more measurements are taken. This saves time without any loss of needed accuracy in view of the multiple distance values being used from the plurality of base units to the collar.

If a value is not returned, however, then the first antenna at the master base unit determines a second distance value between itself and the second antenna on the collar. If a value is returned to the master base unit from the second collar antenna, then that value is used as the distance between the master base unit and the collar. If a value is not returned, however, the process continues with the second antenna on the master base unit and one or both of the antennas on the collar, as needed.

Each of the remaining base units determines the distance between itself and the collar on a similar basis. Because only one good distance value is required between either of the collar antennas and either of the base unit antennas in each case, the ranging process is accelerated while the location of the dog is still very accurately determined.

Having two antennas at each of the base units and at the collar improves the ratio of successfully received signal transmissions to lost signals as compared with single antenna systems. This improved ratio is particularly helpful in a household environment in which buildings, shrubs, vehicles and other objects can act to interfere with and/or block signal transmissions, since blocked signals can result in the unwanted issuance of a correction to the dog, i.e., the dog is corrected even though still within the prescribed boundary. The system may also be configured to have only one antenna at each of the base units as previously noted.

The double antenna system also provides for dead zone detection and accommodation. A dead zone is defined as an area in which signal transmission may be lost or compromised. If such dead zones are not detected or otherwise taken into account, this omission can result in an unwanted correction being issued to the dog as the system may conclude from the lack of signal transmission that the dog is outside the boundary. A fuller discussion of the dead zone feature is set forth in the '339 application.

Because the system according to the present invention uses four base units, the actual location of the dog within the containment area can be reliably determined on a real time basis. While the system can work with only three base units, the addition of the fourth unit allows tracking to continue without interruption even if the dog enters an area in which signal transmission from or communication with one of the anchors may be blocked or otherwise attenuated.

Figure 12:
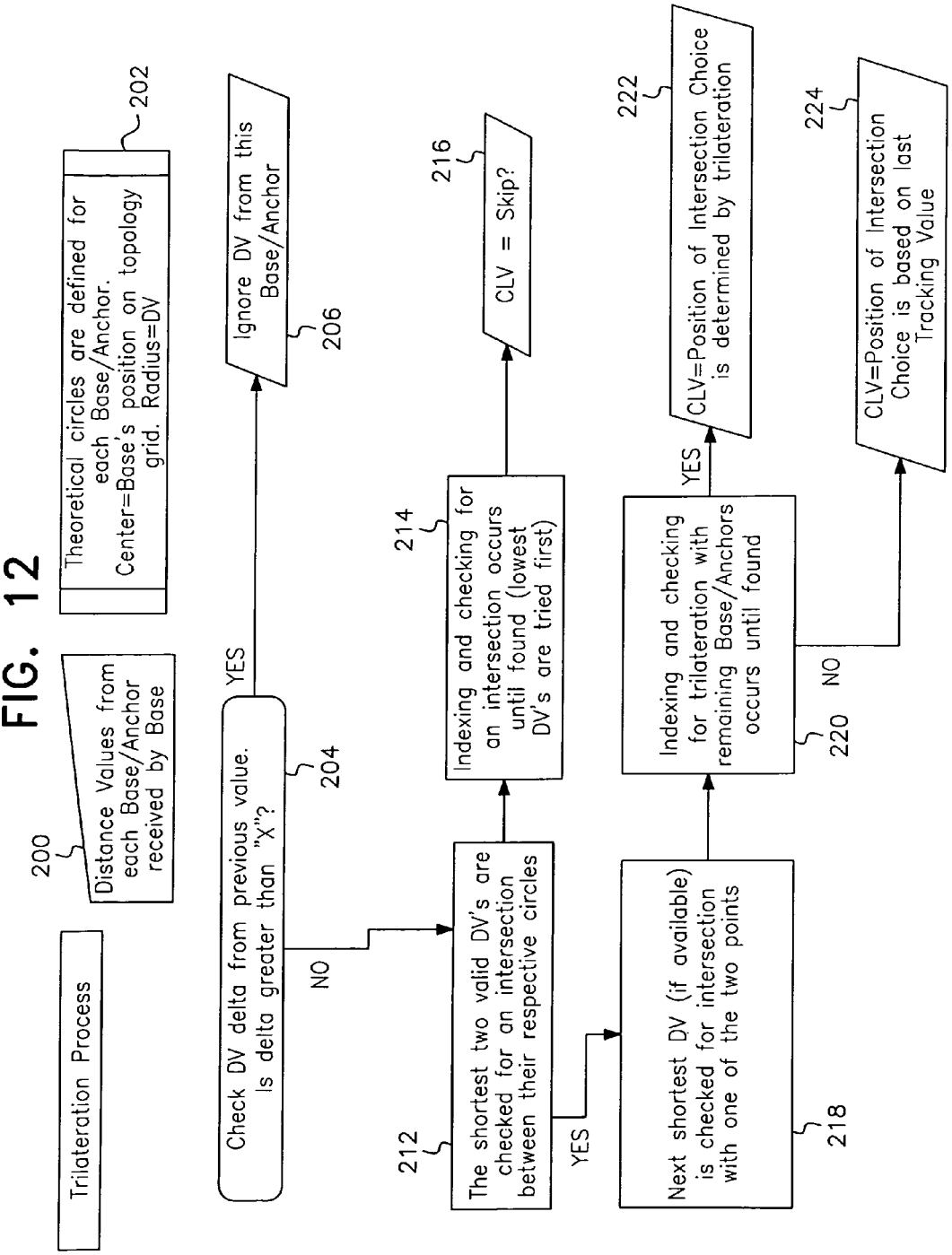
FIG. 12 is a flowchart showing the steps taken during the trilateration process of the system shown in FIG. 1.

To determine the actual location of the dog from the determined distance values between the collar and each of the base units, the system uses a trilateration process as summarized in FIG. 12. According to this process, distance values indicating the respective distances between each of the anchors and the collar are received by the master base unit, step 200. To identify and ignore anomalous distance values, the difference between the current distance value is compared with the previous distance value provided by each anchor to see if the difference or delta is greater than a threshold "X", step 204. If the difference is greater than the threshold "X", for example if the delta is greater than eight meters between consecutive values, the current distance value is ignored as likely being in error, step 206.

Figure 13A:
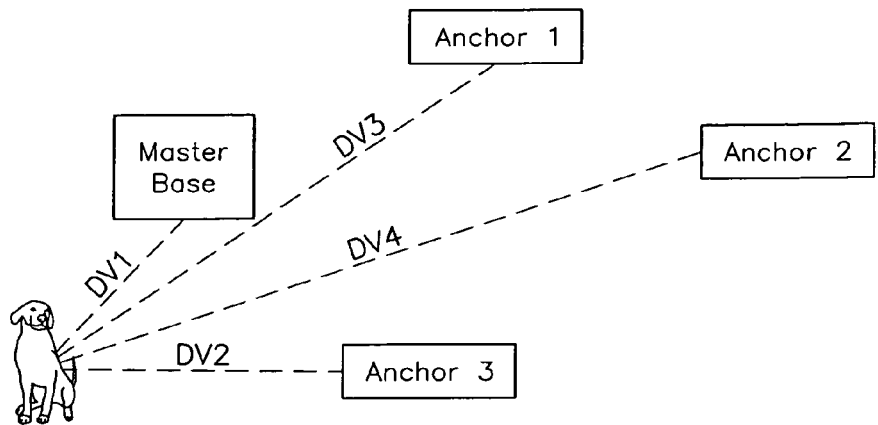
FIGS. 13A-13C illustrate the process by which distance values between the master base unit and the anchors are compared and used to define intersecting circles that pinpoint the dog's location within the containment area in accordance with the present invention.
Figure 13B:
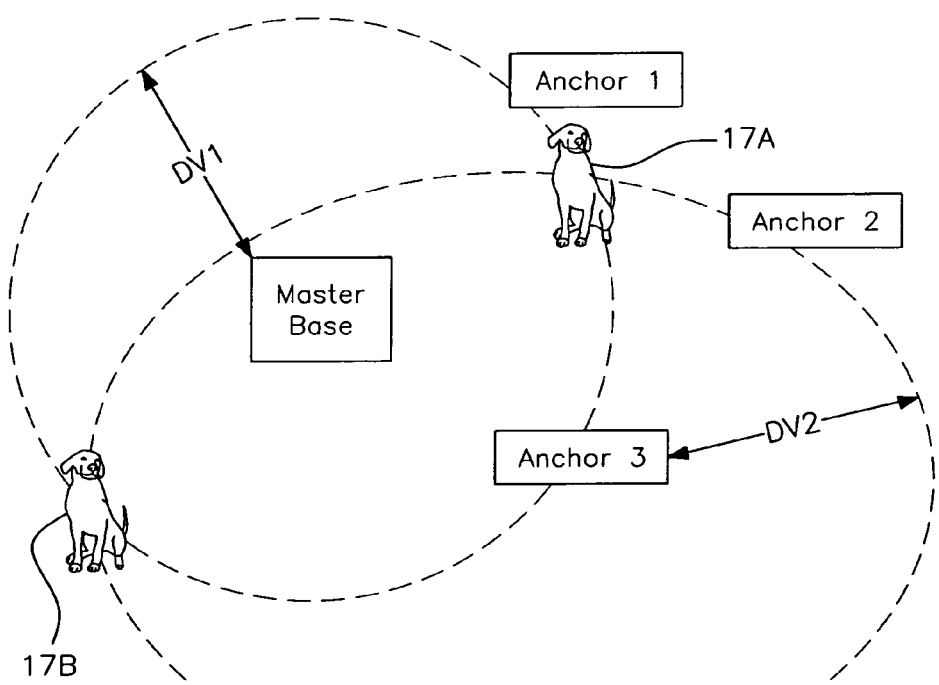

If the distance value is not greater than the threshold "X", step 204, then the system compares the four distance values obtained in step 200. This comparison is illustrated in FIG. 13A with DV1 being the distance value between the collar and the master base unit, DV2 being the distance value between the collar and the third anchor, DV3 being the distance value between the collar and the first anchor, and DV4 being the distance value between the collar and the second anchor. Theoretical circles are then defined around each anchor and around the master base unit, with the radius of each circle being equal to the distance value returned by the respective base unit, step 202. At any given time, two of the base units will be nearest to the collar. Depending upon the position of the dog relative to the base units, these two shortest distance values may be used first, step 212. In the case of FIG. 13A, the shortest distance values are DV1 and DV2, and the system checks for an intersection between their two respective circles as illustrated in FIG. 13B by the circles around the master base unit and the third anchor. If an intersection is not found, the system indexes or steps to the anchor having the next lowest distance value to look for an intersection between the circle surrounding that anchor and one of the other two circles, step 214. These steps of indexing through the anchors and checking for an intersection are taken for each anchor until either an intersection is found or it is determined that there are insufficient "good" current location values to make a valid tracking decision. If a valid tracking decision cannot be made, then the current location value is ignored or skipped, step 216, and the system waits for the next current location value data in the ongoing tracking process.

Figure 13C:
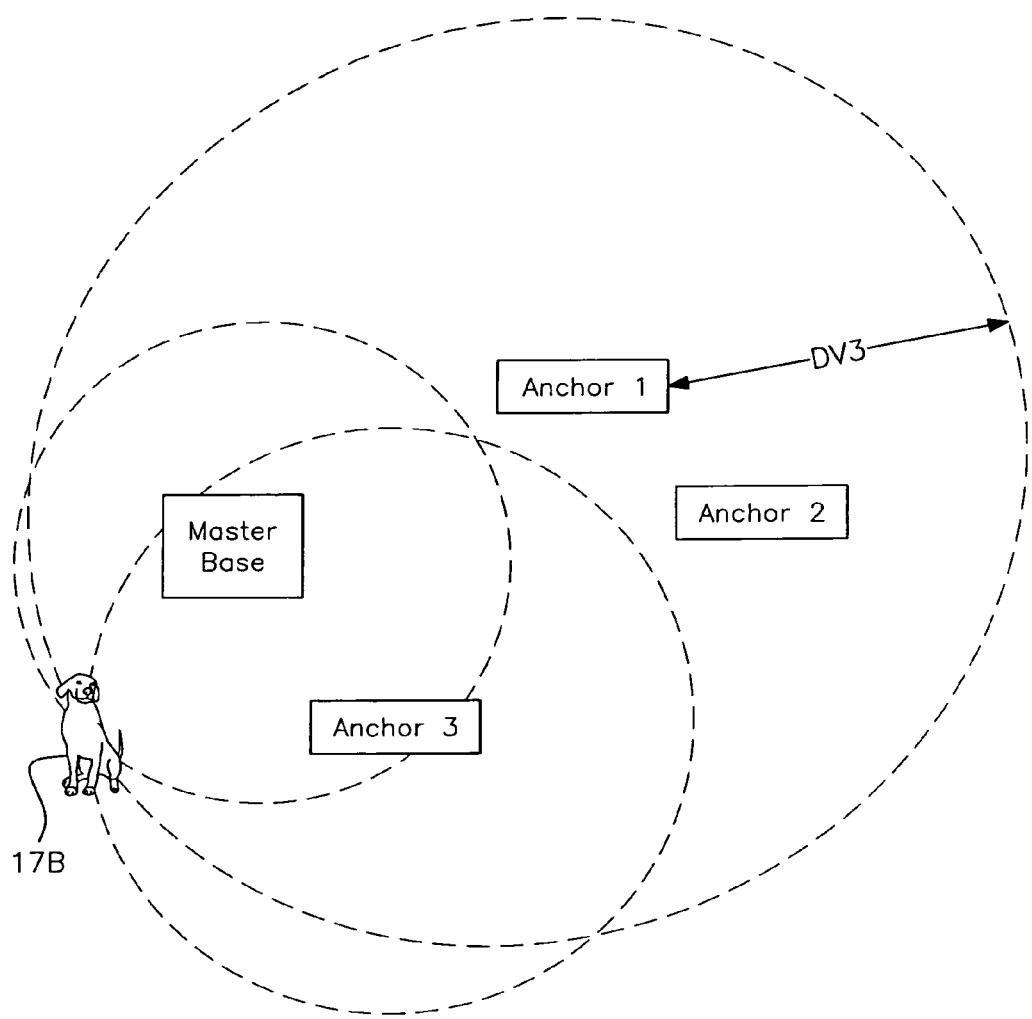

When the two circles intersect as shown in FIG. 13B, there will be two points of intersection 17A and 17B, each of which is a possible current location of the dog. To determine which of the points is the correct one, the circle surrounding the anchor that provided the next shortest distance value, Anchor 1 in FIG. 13C, is used as a third circle and checked for intersection with one of the two points identified by the intersection of the first two circles, within a tolerance value. The tolerance value takes into account that a precise intersection of all three circles may not occur, due to attenuation and/or the performance tolerance of the NANOLOC™ chipset. Specifically, since the NANOLOC™ chipset has a tolerance of +/−2 meters, an intersection is considered to have occurred if the third circle is at a distance within this tolerance range from one of the two possible dog location points. The lowest tolerance value is used first, but escalating tolerances may be used thereafter up to a maximum distance limit, step 220. For example, if the lowest tolerance value is three meters, the system will identify an intersection if the third circle is within three meters of one of the points. If no intersection is found, the system may be set to escalate the tolerances so as to look for an intersection within five meters, or within seven meters, etc., up to the maximum distance value. If the maximum distance value is reached, for example if no intersection occurs within 15 meters, the system ignores that base unit. The system then indexes and checks for trilateration with the remaining base unit or units until an intersection between a respective third base unit circle and one of the two points is found.

If an intersection is found below the maximum distance limit, the current location value of the dog is the position or point at which the three circles "intersect", taking into account the tolerance value, step 222. This point is represented by point 17B in FIG. 13C. If an intersection is not found below the maximum distance limit, the last tracking location value is used to determine which of the two intersection values is the correct value, step 224.

To "smooth out" the current location values to avoid an inadvertent correction to the dog and to more accurately track the dog's location, various types of filtering and/or weighting algorithms may be employed to filter the values as would be known by persons of ordinary skill in the art. One such filtering technique using a Kalman filtering algorithm is described in a paper entitled, "An Introduction to the Kalman Filter" by Greg Welch and Gary Bishop in the Department of Computer Science at the University of North Carolina at Chapel Hill. The Kalman filtering algorithm assigns a weight to each measured distance value according to the apparent reliability or confidence of the measurement sample. The confidence of the measurement sample is determined on the basis of a comparison made between the currently measured distance value and the previously determined tracking location value as determined by the Kalman filtering algorithm. If the difference is too great, then the currently measured distance value is considered suspect and is given little weight when calculating the next tracking location value.

According to a preferred method of "smoothing out" the current location values, the system performs a series of weighted averaging calculations using the current location values. The weighting is determined by the trilateration level (TL) of each current location value (CLV).

More specifically, the TL value is a relative measure of the nearness of the third base unit's circle to the intersection point of the first two base units' circles. After checking all of the base unit possibilities for a pair of intersections, the value of the nearest third circle is used to determine which of the intersections is the actual location of the dog. If the third circle is within a specified distance from one of the intersection points, say within one meter, for example, then that represents a very good (believable) TL value. As the distance between the third circle and one of the intersection points increases, the TL value becomes less trustworthy.

To account for this difference in distance, TL values are ranked according to likely accuracy. For example, according to one possible implementation, a TL value of "1" is assigned to a distance of less than one meter; a TL value of "2" is assigned to distance values of between 3 meters and 1 meter; a TL value of "3" is assigned to distance values of between 5 meters and 3 meters; and so on. Clearly, other ranges could be specified without departing from the intent of the weighting scheme being described herein. Continuing with this example, TL values of "1" are weighted 100%; TL values of "2" are weighted 80%; and TL values of "3" are weighted 60%; and so on. The weighting can be continued in a step-down fashion to a point where the distance is considered to be beyond a believable point, say 15 meters.

Once the weights have been set, a series of CLV's are preferably averaged using the assigned weights in order to calculate a tracking location value indicating the dog's position. The averaging can be varied by changing the number of historical points that go into the calculation, such as two values, three values, and so on. Generally, it is preferred to use five points or less as relying on a greater number of points, and taking the time required to gather and process them, slows the system's reaction to fast movement.

For the purposes of this example, three points will go into determining a tracking location value (TLV). These three points are: 1) CLV1 at (3,2) with a TL value of 1; 2) CLV2 at (4,2) with a TL value of 1; and 3) CLV3 at (5,2) with a TL value of 1. Given these points, the TLV can be calculated as follows:

$$TLV=[(3+4+5)/3],[(2+2+2/3)]=(4,2)$$

As may not be immediately evident from this example, both the CLV and the TL value are weighted. To illustrate this, another example will be given, also using three points. These three points are: 1) CLV1 at (3,2) with a TL value of 1; 2) CLV2 at (4,2) with a TL value of 2; and 3) CLV3 at (5,2) with a TL value of 3. Given these points, the TLV can be calculated as follows:

$$TLV=[(3+0.8*4+0.6*5)/(1+0.8+0.6)],[(2+0.8*2+0.6*2)/(1+0.8+0.6)]=(3.83,2)$$

By weighting and then averaging a certain number of CLV's in this way, the benefit of smoothed tracking is achieved which can be used both during the fence setting mode and, even more advantageously, while tracking the location of the collar.

As summarized in FIG. 14, once set up, the wireless fence system 10 maintains a monitoring mode during which the remote controller 15 displays information relating to the status of the battery charge level of the collar 14 and of the remote controller 15, the fence status (on or off), and whether a breach is detected, step 230. A breach is detected using a modified point-in-polygon methodology, step 232. More particularly, using the tracking location value/current location value as the starting location, a vector is mathematically generated from that point to infinity. The number of fence and exclusion zone line segments that are intersected by the resulting vector is calculated. If that number is odd, then the tracking location value/current location value is in an allowed area. If that number is even or zero, however, then the tracking location value/current location value is either in an exclusion zone or outside the fence boundary, i.e., a breach has occurred. When a breach is detected, the system enters a correction mode as will be described further hereinafter.

To reduce the likelihood of an unwanted correction being administered to the dog, the system according to the present invention includes a tracking process which is summarized in FIG. 15. When performing the tracking process, a valid current location value is stored in memory, such as a flash memory at the master base unit, step 240. However, the base units and collar continually transmit and receive signals to calculate updated current location values on an on-going basis to track the dog in real time. During this ongoing process, particular current location values determined at any given time may be slightly inaccurate with respect to the actual location of the dog, indicating the dog to be outside the roaming area when, in fact, the dog is still inside the roaming area. These errant values, if taken on face value, would result in an unwanted correction being administered to the dog. Hence, the tracking process according to the present invention uses weighting and an averaging subroutine, such as described above, to "smooth out" consecutive current location values by averaging several values so that errant values caused by tolerances and attenuation will be compensated for or ignored, step 242.

In addition, when each current location value is obtained, such value is checked to determine whether a maximum distance delta from the previous current location value has been exceeded, step 252. If the maximum delta value has been exceeded, the associated current location value is ignored as being erroneous. By providing this means of accommodating a degree of error associated with each current location value due to performance tolerances of the system, both from environmental attenuation and the specified NANOLOC™ chipset tolerance of +/−2 meters, a more accurate tracking location value is thereby obtained, step 244, as will be described more fully hereinafter.

As already described, the tracking process continually compares the current location value of the collar with boundary and exclusion zone status, step 246, through use of the averaging subroutine. If the current location value is deemed a valid value and is inside the fence and outside the exclusion zone(s), no action is taken, step 248. If the current location value is deemed valid and, along with at least one of the previous five current location values, is outside the fence boundary or inside an exclusion zone, however, a correction sequence is commenced, step 248. Also, to further adjust for fast movement, the system may be configured to initiate a correction as soon as a single current location value is outside the border, or upon two current location values in a row being outside, for example. In this way, the time lag associated with the usual averaging process may be reduced or eliminated when time is of the essence.

As summarized in FIG. 16, the correction process begins when the master base unit sends a command to the collar to correct, step 410. Upon receipt of this command, the collar is activated and issues a correction in the form of a tone and/or physical correction, step 412. The correction continues until a set time-out period has been reached, step 414, or until the dog returns to the roaming area, step 416. If the time-out period has been reached, step 414, the correction stops, step 418. If the time-out period has not been reached, step 414, and the dog has returned within the roaming area, step 418, the correction also stops. If, however, the time-out period has not been reached and the dog has not returned, step 416, the correction continues, step 412. The length of the correction cycle can be varied, but according to one preferred embodiment the correction cycle is about 30 seconds. The extent to which the dog must return within the roaming area before the correction is stopped can be variably set according to system design and settings.

The present invention further achieves enhanced robustness in adverse conditions through strength enhancement of the signals being exchanged between the collar and the base units. This strength enhancement, or signal amplification, allows the base units and collar to conduct the ranging and tracking processes more accurately than is possible with just the conventionally configured NANOLOC™ chipsets when operating in a household environment where buildings, shrubs, vehicles, etc., can interfere with signal receipt and transmission. According to a preferred embodiment, power amplification circuitry is integrated to work with the NANOLOC™ chipsets to provide greater signal strength.

The foregoing descriptions and drawings should be considered as illustrative only of the principles of the invention. The invention may be configured in a variety of ways and is not limited by the dimensions of the preferred embodiment. Numerous applications of the present invention will readily occur to those skilled in the art. Therefore, it is not desired to limit the invention to the specific examples disclosed or the exact construction and operation shown and described. Rather, all suitable modifications and equivalents may be resorted to, falling within the scope of the invention.

What is claimed is:

1. A wireless fence system for containing one or more dogs in a user-defined roaming area comprising:

a master base unit including a transceiver unit and at least two slave base units each having a transceiver unit, said master base unit and said slave base units being positioned in spaced relationship to one another within a generally central location;

a master base unit activating mechanism for activating the master base unit during a system topology set-up stage to initiate a communication sequence between the master base unit and the slave base units during which respective distances and spatial relationships between the master base unit and the slave base units are determined and placed on a predefined planar coordinate system in which said distances and spatial relationships are identified by respective coordinates within said planar coordinate system to define an overall base unit topology;

at least one collar worn by a dog, said collar including a transceiver unit in signal communication with the transceiver units of said master base unit and said slave base units, each of said base units being configured to continuously obtain distance values between itself and the collar on a real time basis using said transceiver units and to communicate said distance values to the master base unit for calculation of a tracking location value indicating a location of the dog within the planar coordinate system using a trilateration process;

a trackable device configured to communicate with the master base unit and the slave base units during a fence set-up stage during which said base units track consecutive positions of the trackable device as the trackable device is moved around a user-defined perimeter surrounding the generally central location, said user-defined perimeter defining a custom-shaped fence, an area inside the fence constituting the user-defined roaming area and an area outside said roaming area constituting a trigger zone;

said collar including a correction unit that initiates administration of a correction to the dog when the tracking location value calculated by the system indicates the dog is in the trigger zone; and said system being further configured to weight and filter a plurality of said continuously obtained distance values when calculating the tracking location value and to assign less weight to distance values considered suspect due to disparity between said suspect distance values and previously measured distance values and previously calculated tracking location values indicating the location of the dog within the planar coordinate system.

2. The wireless fence system as set forth in claim 1, wherein each of said base units includes a first base antenna and a second base antenna and said collar includes a first collar antenna and a second collar antenna.

3. The wireless fence system as set forth in claim 2, wherein said collar correction unit includes a compartment containing a printed circuit board (PCB) assembly, said collar transceiver being integrated within said PCB assembly.

4. The wireless fence system as set forth in claim 3, wherein said collar further includes a first strap part connected to one side of said compartment and a second strap part connected to an opposite side of said compartment, said strap parts being configured to fasten said collar around a dog's neck, said first collar antenna being inserted into a blind channel in said first strap part and said second collar antenna being inserted into a blind channel in said second strap part, free ends of said first and second collar antennas protruding from said strap parts being received within said compartment and coupled to connectors on said PCB assembly.

5. The wireless fence system as set forth in claim 4, wherein said compartment includes an upper housing and a lower housing, said PCB assembly and the free ends of said strap parts being received within said lower housing, and said upper housing being sealed to said lower housing so that said collar is waterproof.

6. The wireless fence system as set forth in claim 1, wherein said generally central location is a house and said base unit topology includes the master base unit and three slave base units that are respectively positioned at four corners of said house.

7. The wireless fence system as set forth in claim 6, wherein said trilateration process includes receiving at the master base unit current distance values from said three slave base units, said distance values including a first distance value (DV1) between said master base unit and said remote unit, a second distance value (DV2) between a first slave base unit and said remote unit, a third distance value (DV3) between a second slave base unit and said remote unit, and a fourth distance value (DV4) between a third slave base unit and said remote unit; defining a circle around said master base unit having a radius equal to DV1; defining a circle around said first slave base unit having a radius equal to DV2; defining a circle around said second slave base unit having a radius equal to DV3; defining a circle around said third slave base unit having a radius equal to DV4; checking for an intersection between those two circles having radii corresponding with the two smallest distance values, said intersection when found including two points, each of said two points representing a possible location of the remote unit; and using a circle having a next smallest distance value as a third circle to find a point of intersection between the third circle and one of said two points within a tolerance value, said point of intersection representing the current location value of the remote unit.

8. The wireless fence system as set forth in claim 7, said system being configured to smooth out the current location value by determining a trilateration level of said current location value, said trilateration level being a relative measure of the nearness of the third circle's point of intersection with one of the two points at which the first two circles intersected, ranking the trilateration level values according to likely accuracy and using said ranked trilateration values to weight the current location value.

9. The wireless fence system as set forth in claim 1, further comprising a plurality of flags placed along or close to the fence by the user during system set-up, said flags visually indicating a proximity of said trigger zone.

10. The wireless fence system as set forth in claim 1, wherein said roaming area includes at least one exclusion zone, a boundary of said exclusion zone being defined by the user during an exclusion zone set-up stage after the fence set-up stage by the user walking the trackable device around the exclusion zone boundary while the base units track consecutive positions of the trackable device.

11. The wireless fence system as set forth in claim 10, wherein said fence and said exclusion zone boundary are made of a plurality of connected line segments, end points of said line segments being defined by selected positions of the trackable device as tracked by the base units during the fence and exclusion zone set-up stages.

12. The wireless fence system as set forth in claim 11, wherein said system is configured to detect a breach of said fence using a point-in-polygon methodology that includes using the tracking location value or a current location value as a starting point, mathematically generating a vector from said starting point to infinity, calculating a number of fence and exclusion zone line segments intersected by said vector, and if said number is odd, determining that the current location value or tracking location value is within the roaming area and, if said number is even, determining that the current location value or tracking location value is either in an exclusion zone or outside the fence.

13. The wireless fence system as set forth in claim 1, further comprising visualization software compatible with a personal computer device having a display screen, said software configured to run during the fence set-up stage and to create a visual representation of the fence which is displayed on the display screen.

14. The wireless fence system as set forth in claim 13, wherein said visualization software includes an auto-scaling feature that automatically sizes the virtual representation of the created fence to a "full-screen" view on the display.

15. The wireless fence system as set forth in claim 13, wherein the visualization software displays the locations of the base units and includes an on-screen grid system that permits the user to make distance measurement estimates between various points shown in the screen.

16. The wireless fence system as set forth in claim 13, wherein said visualization software is configured to create a visual depiction of the fence on the display as the user walks the fence with the collar and to present at least one screen appearance change upon movement of the collar into the trigger zone indicating a breach of the fence.

17. The wireless fence system as set forth in claim 16, wherein said screen appearance change includes a change in color of the fence when the breach occurs.

18. The wireless fence system as set forth in claim 13, wherein said visualization software creates a digital log file of the consecutive positions of the trackable device recorded during fence set-up, said digital log file providing the data that is used to create the visual representation of the fence which is displayed on the display screen.

19. The wireless fence system as set forth in claim 1, wherein said trackable device is the collar.

20. The wireless fence system as set forth in claim 1, further comprising a remote controller.

21. The wireless fence system as set forth in claim 20, wherein said remote controller is configured as said trackable device.

22. A method of defining a custom roaming area and of locating an object within the roaming area using a wireless fence system, said system including a plurality of base units including a master base unit and at least two slave base units each having a transceiver unit, and at least one movable remote unit constituting the object to be located and having a transceiver unit, said method comprising the steps of:

placing the base units in spaced relationship to one another with respect to a generally central location;

activating the master base unit to bring said master base unit and said slave base units into two-way communication with one another, said master base unit determining and recording respective distances and spatial relationships between itself and the slave base units on a predefined planar coordinate system in which said distances and spatial relationships are identified by respective coordinates within said planar coordinate system to define an overall base unit topology;

creating the custom roaming area by a user moving a trackable device along a path that defines a fence surrounding the roaming area, said base units tracking consecutive positions of the trackable device as the trackable device is moved along the path, an area outside said fence constituting a trigger zone;

placing the movable remote unit within the roaming area and continuously obtaining distance values between each of the base units and the remote unit on a real time basis;

calculating by the master base unit current location values of the remote unit within the planar coordinate system on an ongoing basis using the distance values and a trilateration process; and weighting and filtering a plurality of said continuously obtained distance values when calculating the current location values and assigning less weight to distance values considered suspect due to disparity between said suspect distance values and previously measured distance values and previously calculated current location values indicating the location of the remote unit within the planar coordinate system.

23. The method as set forth in claim 22, further comprising the step of verifying, by the user, the fence location after creating the custom roaming area, said step of verifying the fence location including running visualization software during the step of creating the custom roaming area, said visualization software being compatible with a personal computer device having a display screen, said software creating a visual representation of the fence which is displayed on the display screen.

24. The method as set forth in claim 23, further comprising, after defining the fence, the step of moving the trackable device along a line adjacent and inside the fence to verify fence location and shape.

25. The method as set forth in claim 23, wherein the visualization software displays the locations of the base units and includes an on-screen grid system that permits the user to make distance measurement estimates between various points shown in the screen.

26. The method as set forth in claim 23, wherein said step of verifying further comprises the step of the user walking the fence with the movable remote unit or other trackable device, said visualization software being configured to create a visual depiction of the fence on the display as the user walks the fence and to present at least one screen appearance change upon movement of the movable remote unit or other trackable device into the trigger zone indicating a breach of the fence.

27. The method as set forth in claim 26, wherein said screen appearance change includes a change in color of the fence when the breach occurs.

28. The method as set forth in claim 23, further comprising said visualization software creating a digital log file of the consecutive positions of the trackable device recorded during the step of creating the custom roaming area, said digital log file providing the data that is used to create the visual representation of the fence which is displayed on the display screen.

29. The method as set forth in claim 28, further comprising the step of using the digital log file as a troubleshooting mechanism to identify any areas of base unit communication difficulty.

30. The method as set forth in claim 29, further comprising reviewing the digital log file and comparing image data obtained therefrom to images from a satellite service to identify any discrepancies exceeding a threshold and, if a discrepancy exceeding the threshold exists, manually entering a topology value more nearly corresponding with the satellite service images.

31. The method as set forth in claim 22, further comprising the step of creating at least one exclusion zone within the roaming area by the user moving the trackable device along a path that will define a boundary surrounding the exclusion zone, said base units tracking consecutive positions of the trackable device as the trackable device is moved along the boundary.

32. The method as set forth in claim 31, wherein said fence and boundary lines are made of a plurality of connected line segments, end points of said line segments being defined by selected positions of the trackable device as tracked and recorded by the base units.

33. The method as set forth in claim 32, further comprising detecting a breach of said fence by said remote unit using a point-in-polygon methodology, said point-in-polygon methodology including the steps of:

using a current location value as a starting point;
mathematically generating a vector from said starting point to infinity;
calculating a number of fence and exclusion zone line segments intersected by said vector;
if said number is odd, determining that the current location value is within the roaming area and, if said number is even, determining that the current location value is either in an exclusion zone or outside the fence.

34. The method as set forth in claim 22, further comprising smoothing out consecutive distance values using a Kalman filtering technique that includes the steps of:

assigning a weight to each measured distance value based on a comparison made between the currently measured distance value and the previously estimated distance value using an algorithm, said algorithm giving less weight to the currently measured distance value if a difference between the currently measured distance value and the previously estimated distance value is greater than a predetermined threshold, and said algorithm giving a greater weight to the currently measured distance value if the difference between the currently measured distance value and the previously estimated distance value is less than the predetermined threshold; and using said weighted distance values to calculate an updated current location value indicating the location of the remote unit within the planar coordinate system.

35. The method as set forth in claim 22, further comprising the step of sounding an alarm at the master base unit when the current location value calculated by the system indicates the remote unit is in the trigger zone.

36. The method as set forth in claim 22, further comprising the steps of placing a plurality of flags along or close to the fence by the user during system set-up, said flags visually indicating a proximity of said trigger zone.

37. The method as set forth in claim 22, wherein said system is a wireless fence product for containing one or more dogs in a user-defined roaming area, said remote unit including a collar worn by a dog, said collar including a collar correction unit, said method further comprising the step of said collar correction unit initiating administration of a correction to the dog when the current location value calculated by the system indicates the dog is in the trigger zone.

38. The method as set forth in claim 22, wherein three slave base units are included and said trilateration process used in said step of calculating a current location value indicating the location of the remote unit includes the steps of:
- receiving at the master base unit current distance values from three of said slave base units, said distance values including a first distance value (DV1) between said master base unit and said remote unit, a second distance value (DV2) between a first slave base unit and said remote unit, a third distance value (DV3) between a second slave base unit and said remote unit, and a fourth distance value (DV4) between a third slave base unit and said remote unit;
- defining a circle around said master base unit having a radius equal to DV1;
- defining a circle around said first slave base unit having a radius equal to DV2;
- defining a circle around said second slave base unit having a radius equal to DV3;
- defining a circle around said third slave base unit having a radius equal to DV4;
- checking for an intersection between those two circles having radii corresponding with the two smallest distance values, said intersection when found including two points, each of said two points representing a possible location of the remote unit;
- using the circle having the next smallest distance value as a third circle to find a point of intersection between the third circle and one of said two possible location points within a tolerance value, said point of intersection representing the current location value of the remote unit.

39. The method as set forth in claim 38, wherein if no intersection is found between the two circles having radii corresponding with the two smallest distance values, checking for an intersection between the circle having the next smallest distance value and the two circles having radii corresponding with the two smallest distance values;
- if no intersection is found, checking for an intersection between the circle having the largest distance value and the two circles having radii corresponding with the two smallest distance values; and
- if no intersection is found, ignoring the current distance values as being unreliable.

40. The method as set forth in claim 38, further comprising the step of ignoring the current distance values if no point of intersection is found between the third circle and one of said two possible location points within said tolerance value.

41. The method as set forth in claim 38, wherein said tolerance value is defined as a range of distances over which the system checks for said point of intersection, failure to find said point of intersection within said range of distances indicating the distance value of said third circle to be suspect, said method then further comprising the step of using the remaining circle to find a point of intersection between the remaining circle and one of said two possible location points within a tolerance value.

42. The method as set forth in claim 38, further comprising the step of smoothing out the current location value by determining a trilateration level of said current location value, said trilateration level being a relative measure of the nearness of the third circle's point of intersection with one of the two possible location points at which the first two circles intersected.

43. The method as set forth in claim 42, further comprising the step of ranking trilateration level values according to likely accuracy and using said ranked trilateration values to weight the current location value.

\* \* \* \* \*